US012652566B2

(12) United States Patent
Duan et al.

(10) Patent No.: US 12,652,566 B2
(45) Date of Patent: Jun. 9, 2026

(54) ENHANCED RADIO FREQUENCY (RF) SENSING MEASUREMENT REPORTS IN CELLULAR SYSTEMS

(71) Applicant: QUALCOMM Incorporated, San Diego, CA (US)

(72) Inventors: Weimin Duan, San Diego, CA (US); Krishna Kiran Mukkavilli, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 18/186,775

(22) Filed: Mar. 20, 2023

(65) Prior Publication Data

US 2024/0323727 A1     Sep. 26, 2024

(51) Int. Cl.
| | |
|---|---|
| *H04W 24/10* | (2009.01) |
| *G01S 5/00* | (2006.01) |
| *H04W 72/044* | (2023.01) |
| *H04W 72/21* | (2023.01) |

(Continued)

(52) U.S. Cl.
CPC ........... *H04W 24/10* (2013.01); *G01S 5/0036* (2013.01); *H04W 72/044* (2013.01); *H04W 72/21* (2023.01); *G01S 7/006* (2013.01); *G01S 13/003* (2013.01); *G01S 2205/008* (2013.01)

(58) Field of Classification Search
CPC .. G01S 13/003; G01S 13/46; G01S 2013/462; G01S 2205/008; G01S 5/0036; G01S 7/006; G01S 7/2883; G01S 7/2886; H04W 24/10; H04W 72/044; H04W 72/21
See application file for complete search history.

(56) References Cited

U.S. PATENT DOCUMENTS

2022/0066014 A1    3/2022  Park et al.
2025/0142390 A1*   5/2025  Dong .................... H04W 24/10

(Continued)

FOREIGN PATENT DOCUMENTS

WO         2022036541 A1     2/2022

OTHER PUBLICATIONS

3GPP: "3rd Generation Partnership Project, Technical Specification Group TSG SA, Feasibility Study on Integrated Sensing and Communication (Release 19)", 3GPP Standard, Technical Report, 3GPP TR 22.837, 3rd Generation Partnership Project, Mobile Competence Centre, 650, Route Des Lucioles, F-06921 Sophia-Antipolis Cedex, France, No. V1.0.0, Mar. 10, 2023, pp. 1-89, XP052283924, Sections 3.1, 5.1-5.29.

(Continued)

*Primary Examiner* — Timothy X Pham

(74) *Attorney, Agent, or Firm* — Polsinelli

(57)     ABSTRACT

Disclosed are systems, apparatuses, processes, and computer-readable media for wireless communications. For example, a network device can receive one or more radio frequency (RF) sensing resources. The network device can determine RF sensing measurements based on the one or more RF sensing resources. For instance, the RF sensing measurements may be based on at least one use case for RF sensing. The network device can transmit, to a network entity, a measurement report comprising the RF sensing measurements for the at least one use case for the RF sensing.

30 Claims, 19 Drawing Sheets

(51) Int. Cl.
    *G01S 7/00*           (2006.01)
    *G01S 13/00*         (2006.01)

(56)               References Cited

U.S. PATENT DOCUMENTS

2025/0212235 A1*   6/2025   Huang  .................. G01S 13/003
2025/0247680 A1*   7/2025   Wu  ......................... G01S 7/006

OTHER PUBLICATIONS

International Search Report and Written Opinion—PCT/US2024/015055—ISA/EPO—May 2, 2024.
Moderator (OPPO): "FL Summary for AI 8.11.1.1—Resource Allocation for Power Saving (EOM)", 3GPP TSG RAN WG1 #106bis-e, R1-2110480, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 21, 2021, 115 Pages, XP052065829, Section 3.3.

* cited by examiner

| Example use cases | Max. Range (m) | Max. Velocity (m/s) | Range Resolution | Velocity Resolution | Angular Resolution |
|---|---|---|---|---|---|
| Traffic monitoring | 500 | ±50 | Medium | Medium | Low |
| Identification of parking spots | 500 | N/A | Medium | NA | Medium |
| Road safety | 100 | ±50 | Medium | Medium | Medium |
| Dynamic 3D maps | 300 | ±30 | High | High | High |
| Drone Monitoring and Management | 500 | ±40 | Medium | High | High |
| Environment monitoring | 500 | N/A | Medium | N/A | N/A |

| Example use cases | Max. Range (m) | Max. Velocity (m/s) | Range Resolution | Doppler Resolution | Angular Resolution |
|---|---|---|---|---|---|
| Human/animal detection | 20 | 4 | Medium (meter level) | Low | Low |
| Fall detection | 10 | 3 | Medium (meter level) | Low | Low |
| Breathing/heart rate estimation | 1 | 2 | Low | Low | Medium |
| Location-aware Control | 20 | 3 | Medium (meter level) | Low | Medium |
| Driver attention monitoring | 1 | N/A | Low | N/A | Low |
| Gesture Recognition | 1 | 20 | Low | High | N/A |
| Keystroke Recognition | 1 | 20 | Low | High | N/A |
| Head Activity Recognition | 3 | 20 | Low | High | N/A |
| Arm Activity Recognition | 3 | 10 | Low | Medium | N/A |

Receive One Or More Radio Frequency (RF) Sensing Resources

1810

Determine RF Sensing Measurements Based On The One Or More RF Sensing Resources, Wherein The RF Sensing Measurements Are Based On At Least One Use Case For RF Sensing

1820

Transmit, To A Network Entity, A Measurement Report Comprising The RF Sensing Measurements For The At Least One Use Case For The RF Sensing

1830

ENHANCED RADIO FREQUENCY (RF) SENSING MEASUREMENT REPORTS IN CELLULAR SYSTEMS

FIELD OF THE DISCLOSURE

The present disclosure generally relates to scheduling and/or processing sensing and communication signals for joint communications and sensing. For example, aspects of the present disclosure relate to providing enhancements for radio frequency (RF) sensing measurement reports in wireless communications systems (e.g., cellular systems).

BACKGROUND OF THE DISCLOSURE

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between UEs, which may involve direct transmissions between two or more UEs.

Due to larger bandwidths being allocated for wireless cellular communications systems (e.g., including 5G and 5G beyond) and more use cases being introduced into the cellular communications systems, multiplexing sensing and communication signals for joint communications and sensing can be an essential feature for existing or future wireless communication systems, such as to enhance the overall spectral efficiency of the wireless communication networks.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for wireless communications. According to at least one example, a network device for wireless communications is provided. The network device includes at least one memory and at least one processor coupled to the at least one memory and configured to: receive one or more radio frequency (RF) sensing resources; determine RF sensing measurements based on the one or more RF sensing resources, wherein the RF sensing measurements are based on at least one use case for RF sensing; and transmit, to a network entity, a measurement report comprising the RF sensing measurements for the at least one use case for the RF sensing.

In another illustrative example, a method is provided for wireless communications at a network device. The method includes: receiving, by the network device, one or more radio frequency (RF) sensing resources; determining, by the network device, RF sensing measurements based on the one or more RF sensing resources, wherein the RF sensing measurements are based on at least one use case for RF sensing; and transmitting, by the network device to a network entity, a measurement report comprising the RF sensing measurements for the at least one use case for the RF sensing.

In another illustrative example, a non-transitory computer-readable medium of a network device is provided having stored thereon instructions that, when executed by at least one processor, cause the at least one processor to: receive one or more radio frequency (RF) sensing resources; determine RF sensing measurements based on the one or more RF sensing resources, wherein the RF sensing measurements are based on at least one use case for RF sensing; and transmit, to a network entity, a measurement report comprising the RF sensing measurements for the at least one use case for the RF sensing.

In another illustrative example, an apparatus for wireless communications is provided that includes: means for receiving one or more radio frequency (RF) sensing resources; means for determining RF sensing measurements based on the one or more RF sensing resources, wherein the RF sensing measurements are based on at least one use case for RF sensing; and means for transmitting, to a network entity, a measurement report comprising the RF sensing measurements for the at least one use case for the RF sensing.

In some aspects, one or more of the network devices, apparatus, or other devices described herein is, is part of, and/or includes a user equipment (UE), a base station (e.g., a gNodeB (gNB), an eNodeB (eNB), etc.), or a portion of a base station (e.g., one or more of a central unit (CU), a distributed unit (DU), a radio unit (RU), a Near-Real Time (Near-RT) RAN Intelligent Controller (RIC), or a Non-Real Time (Non-RT) RIC of the base station). The UE may be a wearable device, an extended reality (XR) device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the one or more of the network devices, apparatus, or other devices may include a camera or multiple cameras for capturing one or more images. In some examples, the one or more of the network devices, apparatus, or other devices may further include a display for displaying one or more images, notifications, and/or other displayable data. In some cases, the one or more of the network devices, apparatus, or other devices may include one or more receivers, transmitters, or transceivers for receiving and/or transmitting wireless communications.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 14 is a table showing examples of different measurements for different use cases for wide area RF sensing, in accordance with some aspects of the present disclosure.

FIG. 15 is a table showing examples of different measurements for different use cases for short range sensing, in accordance with some aspects of the present disclosure.

DETAILED DESCRIPTION

Figure 1:
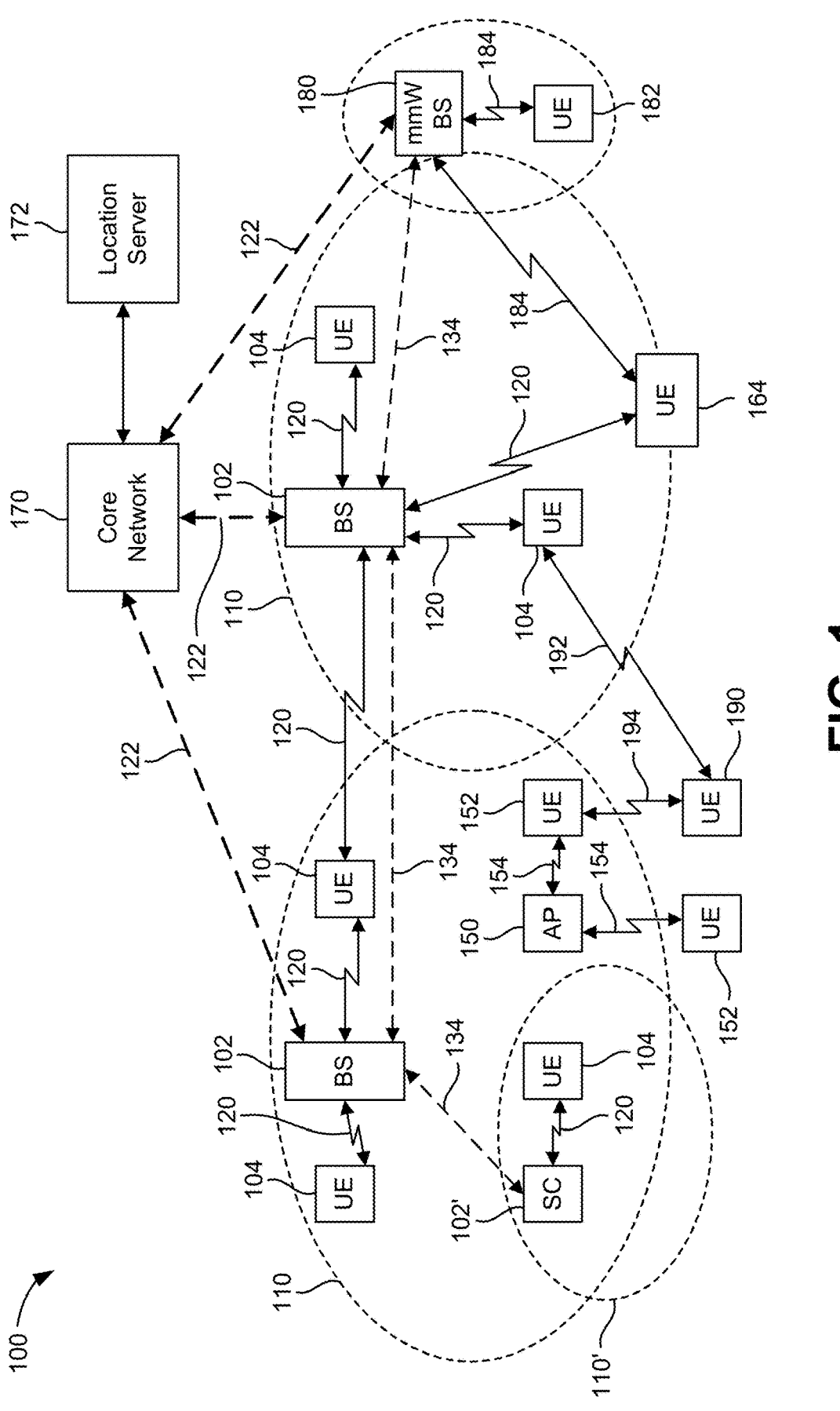
FIG. 1 is a diagram illustrating an example wireless communications system, which may be employed by the disclosed systems and techniques for enhancements on radio frequency (RF) sensing measurement reports in cellular systems, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Radar sensing systems use radio frequency (RF) waveforms to perform RF sensing to determine or estimate one or more characteristics of a target object, such as the distance, angle, and/or velocity of the target object. A target object may include a vehicle, an obstruction, a user, a building, or other object. A typical radar system includes at least one transmitter, at least one receiver, and at least one processor. A radar sensing system may perform monostatic sensing when one receiver is employed that is co-located with a transmitter. A radar system may perform bistatic sensing when one receiver of a first device is employed that is located remote from a transmitter of a second device. Similarly, a radar system may perform multi-static sensing when multiple receivers of multiple devices are employed that are all located remotely from at least one transmitter of at least one device.

During operation of a radar sensing system, a transmitter transmits an electromagnetic (EM) signal in the RF domain towards a target object. The signal reflects off of the target object to produce one or more reflection signals, which provides information or properties regarding the target, such as target object's location and speed. At least one receiver receives the one or more reflection signals and at least one processor, which may be associated with at least one receiver, utilizes the information from the one or more reflection signals to determine information or properties of the target object. A target object can also be referred herein as a target.

Generally, RF sensing involves monitoring moving targets with different motions (e.g., a moving car or pedestrian, a body motion of a person, such as breathing, and/or other micro-motions related to a target). Doppler, which measures the phase variation in a signal and is indicative of motion, is an important characteristic for sensing of a target.

In some cases, the radar sensing signals, which can be referred to as radar reference signals (RSs), such as sensing reference signals (S-RS), may be designed for and used for sensing purposes. Radar RSs do not contain any communications information. Conversely, communication RSs, such as demodulation reference signals (DMRSs), are typically designed for and solely used for communications purposes, such as estimating channel parameters for communications.

Cellular communications systems are designed to transmit communication signals on designated communication frequency bands (e.g., 23 gigahertz (GHz), 3.5 GHz, etc. for 5G/NR, 2.2 GHz for LTE, among others). RF sensing systems are designed to transmit RF sensing signals on designated radar RF frequency bands (e.g., 77 GHz for autonomous driving). The spectrum for communications and sensing is very likely to be shared in future cellular communication systems, in which case the communications and sensing should be jointly considered.

In some cases, due to larger bandwidths being allocated for wireless communications systems (e.g., including cellular communications systems such as 4G/LTE, 5G/NR, and beyond) and more use cases being introduced into the wireless communications systems, joint communications and sensing (JCS) can be an essential feature for existing or future wireless communication systems. In the $3^{rd}$ Generation Partnership Project (3GPP) Release 18, for example, several companies have proposed to study "integrated RF sensing and communications. For 3GPP Release 19, it is expected that more companies will propose to study JCS or RF sensing in NR. Simultaneously performing wireless communications and radar sensing can provide for a cost-efficient deployment for both radar and communication systems.

In bistatic sensing, multi-static sensing, and monostatic sensing, a sensing node (e.g., a network device, which may be in the form of a UE, such as a smart phone, or a base station, such as gNB) may need to report sensing measurements to the network (e.g., to a network entity, which may be in the form of a network server, such as a radar server or a location server). This reporting of sensing measurements by the sensing node may be similar to the NR process of reporting of measurements for positioning by a UE.

However, typically, the RF sensing measurements are different than the measurements for UE positioning. For example, conversely to RF sensing measurements, UE positioning measurement reports generally only involve a line of sight (LOS) path or multiple hypothesis of LOS paths (e.g., including multiple time of arrival (TOA) measurements and/or other multiple time-related measurements).

In addition, the number of different types of sensing measurements for RF sensing may be larger than the number of types of positioning measurements for UE positioning, especially considering the many different diverse use cases for RF sensing. For example, UE positioning measurements may include angular estimation. However, RF sensing measurements may include angular estimation as well as speed estimation and range estimation.

In some cases, for RF sensing, machine learning and/or artificial intelligence (AI) technology can be used to extract information from raw channel estimations (e.g., from raw measurements). For RF sensing, raw measurements may provide additional sensing information that is beyond the sensing information obtained from signal measurements, such as angle, range, and speed. For RF sensing, the raw measurements, including the raw channel estimations, can potentially be used to extract rich sensing information for the sensed environment. As such, enhancements in RF sensing measurement reports for wireless communications systems (e.g., cellular systems) can be beneficial.

In some aspects of the present disclosure, systems, apparatuses, methods (also referred to as processes), and computer-readable media (collectively referred to herein as "systems and techniques") are described herein that provide solutions for enhancements on RF sensing measurement reports in cellular systems. The systems and techniques provide various different measurement reports for RF sensing including, but not limited to, a per use-case based measurement report, a frequency domain measurement report, and a multi-step sensing measurement report.

The systems and techniques described herein provide various advantages over existing systems, including reducing signaling overhead, increasing RF sensing performance, prioritizing sensing measurements for different use cases (leading to efficient communications), among other benefits.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal includes an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100, which may be employed by the disclosed systems and techniques described herein for enhancements on RF sensing measurement reports in cellular systems. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "second-ary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and sig-nals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serv-ing cell," "component carrier," "carrier frequency," and the like can be used interchangeably.

For example, still referring to FIG. 1, one of the frequen-cies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asym-metric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on. As noted above, UE 104 and UE 190 can be configured to communicate using sidelink communications. In some cases, a sidelink transmission can include a request for feedback (e.g., a hybrid automatic repeat request (HARQ)) from the receiving UE.

Figure 2:
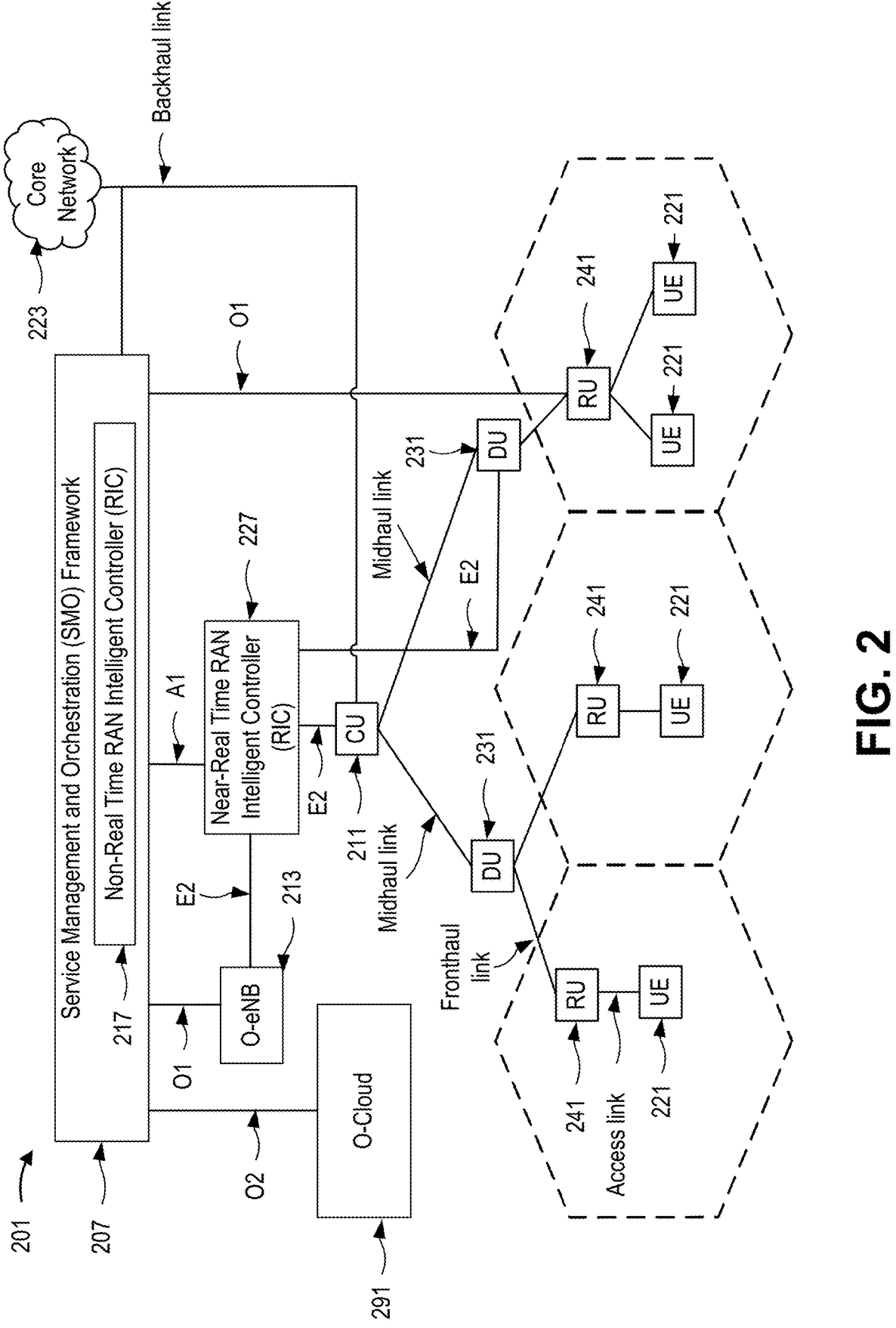
FIG. 2 is a diagram illustrating an example of a disaggregated base station architecture, which may be employed by the disclosed systems and techniques for enhancements on RF sensing measurement reports in cellular systems, in accordance with some aspects of the present disclosure.

FIG. 2 is a diagram illustrating an example of a disaggregated base station architecture, which may be employed by the disclosed systems and techniques for enhancements on RF sensing measurement reports in cellular systems. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 2 shows a diagram illustrating an example disaggregated base station 201 architecture. The disaggregated base station 201 architecture may include one or more central units (CUs) 211 that can communicate directly with a core network 223 via a backhaul link, or indirectly with the core network 223 through one or more disaggregated base station units (such as a Near-Real Time (Near-RT) RAN Intelligent Controller (RIC) 227 via an E2 link, or a Non-Real Time (Non-RT) RIC 217 associated with a Service Management and Orchestration (SMO) Framework 207, or both). A CU 211 may communicate with one or more distributed units (DUs) 231 via respective midhaul links, such as an F1 interface. The DUs 231 may communicate with one or more radio units (RUs) 241 via respective fronthaul links. The RUs 241 may communicate with respective UEs 221 via one or more RF access links. In some implementations, the UE 221 may be simultaneously served by multiple RUs 241.

Each of the units, i.e., the CUs 211, the DUs 231, the RUs 241, as well as the Near-RT RICs 227, the Non-RT RICs 217 and the SMO Framework 207, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 211 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211. The CU 211 may be configured to handle user plane functionality (i.e., Central Unit-User Plane (CU-UP)), control plane functionality (i.e., Central Unit-Control Plane (CU-CP)), or a combination thereof. In some implementations, the CU 211 can be logically split into one or more CU-UP units and one or more CU-CP units. The CU-UP unit can communicate bidirectionally with the CU-CP unit via an interface, such as the E1 interface when implemented in an O-RAN configuration. The CU 211 can be implemented to communicate with the DU 231, as necessary, for network control and signaling.

The DU 231 may correspond to a logical unit that includes one or more base station functions to control the operation of one or more RUs 241. In some aspects, the DU 231 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 231 may further host one or more low PHY layers. Each layer (or module) can be implemented with an interface configured to communicate signals with other layers (and modules) hosted by the DU 231, or with the control functions hosted by the CU 211.

Lower-layer functionality can be implemented by one or more RUs 241. In some deployments, an RU 241, controlled by a DU 231, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241 can be implemented to handle over the air (OTA) communication with one or more UEs 221. In some implementations, real-time and non-real-time aspects of control and user plane communication with the RU(s) 241 can be controlled by the corresponding DU 231. In some scenarios, this configuration can enable the DU(s) 231 and the CU 211 to be implemented in a cloud-based RAN architecture, such as a vRAN architecture.

The SMO Framework 207 may be configured to support RAN deployment and provisioning of non-virtualized and virtualized network elements. For non-virtualized network elements, the SMO Framework 207 may be configured to support the deployment of dedicated physical resources for RAN coverage requirements which may be managed via an operations and maintenance interface (such as an O1 interface). For virtualized network elements, the SMO Framework 207 may be configured to interact with a cloud computing platform (such as an open cloud (O-Cloud) 291) to perform network element life cycle management (such as to instantiate virtualized network elements) via a cloud computing platform interface (such as an O2 interface). Such virtualized network elements can include, but are not limited to, CUs 211, DUs 231, RUs 241 and Near-RT RICs 227. In some implementations, the SMO Framework 207 can communicate with a hardware aspect of a 4G RAN, such as an open eNB (O-eNB) 213, via an O1 interface. Additionally, in some implementations, the SMO Framework 207 can communicate directly with one or more RUs 241 via an O1 interface. The SMO Framework 207 also may include a Non-RT RIC 217 configured to support functionality of the SMO Framework 207.

The Non-RT RIC 217 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 227. The Non-RT RIC 217 may be coupled to or communicate with (such as via an A1 interface) the Near-RT RIC 227. The Near-RT RIC 227 may be configured to include a logical function that enables near-real-time control and optimization of RAN elements and resources via data collection and actions over an interface (such as via an E2 interface) connecting one or more CUs 211, one or more DUs 231, or both, as well as an O-eNB 213, with the Near-RT RIC 227.

In some implementations, to generate AI/ML models to be deployed in the Near-RT RIC 227, the Non-RT RIC 217 may receive parameters or external enrichment information from external servers. Such information may be utilized by the Near-RT RIC 227 and may be received at the SMO Framework 207 or the Non-RT RIC 217 from non-network data sources or from network functions. In some examples, the Non-RT RIC 217 or the Near-RT RIC 227 may be configured to tune RAN behavior or performance. For example, the Non-RT RIC 217 may monitor long-term trends and patterns for performance and employ AI/ML models to perform corrective actions through the SMO Framework 207 (such as reconfiguration via 01) or via creation of RAN management policies (such as A1 policies).

Figure 3:
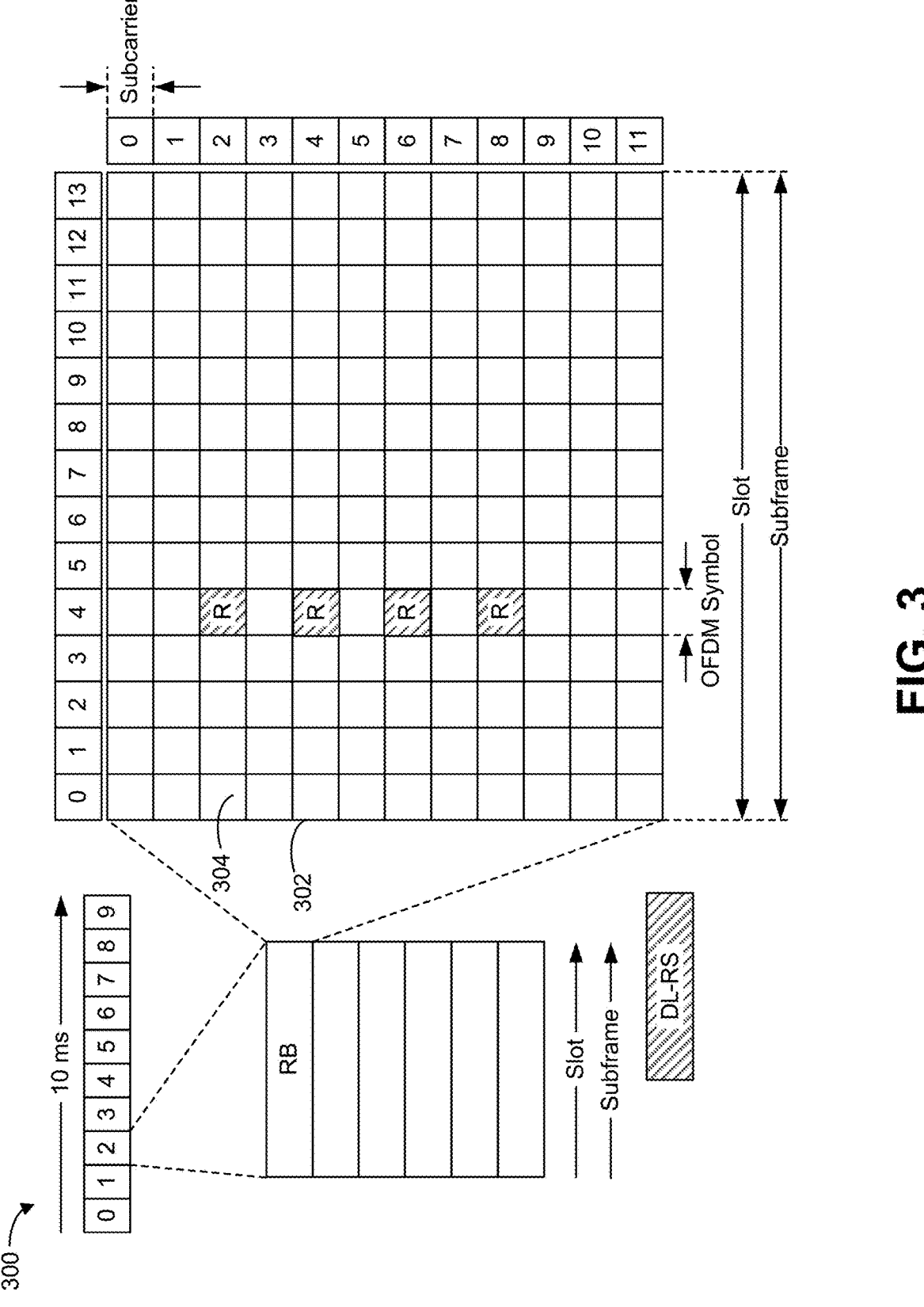
FIG. 3 is a diagram illustrating an example of a frame structure, which may be employed by the disclosed systems and techniques for enhancements on RF sensing measurement reports in cellular systems, in accordance with some aspects of the present disclosure.

Various radio frame structures may be used to support downlink, uplink, and sidelink transmissions between network nodes (e.g., base stations and UEs). FIG. 3 is a diagram 300 illustrating an example of a frame structure, which may be employed by the disclosed systems and techniques for enhancements on RF sensing measurement reports in cellular systems. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (p). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| | SCS (kHz) | Sym- bols/ Sot | Slots/ Sub- frame | Slots/ Frame | Slot Dura- tion (ms) | Sym- bol Dura- tion (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302. Data or information for joint communications and sensing may be included in one or more RBs 302. The RB 302 is arranged with the time domain on the horizontal (or x-) axis and the frequency domain on the vertical (or y-) axis. As shown, the RB 302 may be 180 kilohertz (kHz) wide in frequency and one slot long in time (with a slot being 1 milliseconds (ms) in time). In some cases, the slot may include fourteen symbols (e.g., in a slot configuration 0). The RB 302 includes twelve subcarriers (along the y-axis) and fourteen symbols (along the x-axis).

An intersection of a symbol and subcarrier can be referred to as a resource element (RE) 304 or tone. The RB 302 of FIG. 3 includes multiple REs, including the resource element (RE) 304. For instance, a RE 304 is 1 subcarrier×1 symbol (e.g., OFDM symbol), and is the smallest discrete part of the subframe. A RE 304 includes a single complex value representing data from a physical channel or signal. The number of bits carried by each RE 304 depends on the modulation scheme.

In some aspects, some REs 304 can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs 304 used to transmit DL-RS (labeled "R").

Figure 4:
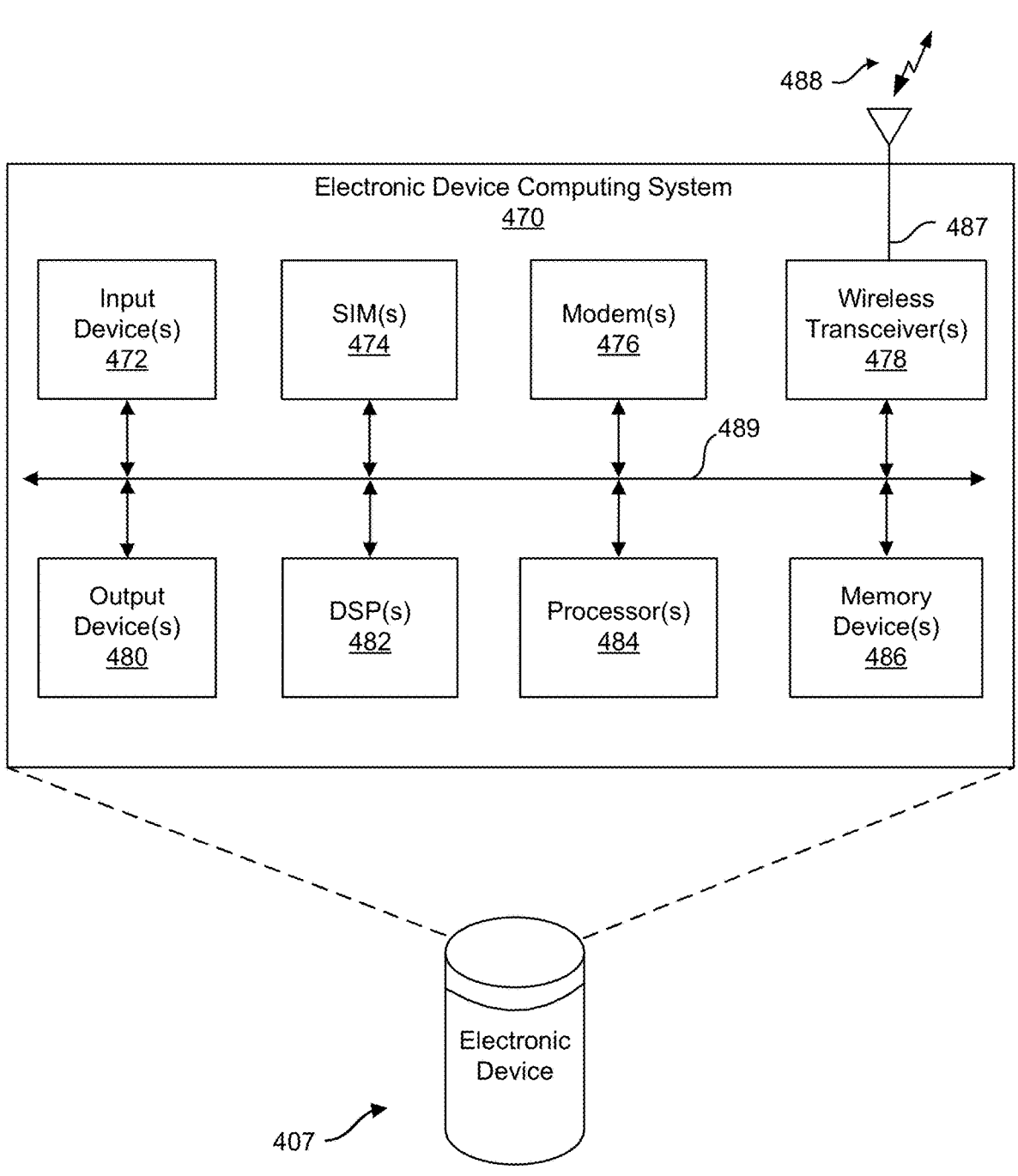
FIG. 4 is a block diagram illustrating an example of a computing system of an electronic device that may be employed by the disclosed systems and techniques for enhancements on RF sensing measurement reports in cellular systems, in accordance with some aspects of the present disclosure.

FIG. 4 is a block diagram illustrating an example of a computing system 470 of an electronic device 407, which may be employed by the disclosed systems and techniques for enhancements on RF sensing measurement reports in cellular systems. The electronic device 407 is an example of a device that can include hardware and software for the purpose of connecting and exchanging data with other devices and systems using a communications network (e.g., a $3^{rd}$ Generation Partnership network, such as a $5^{th}$ Generation (5G)/New Radio (NR) network, a $4^{th}$ Generation (4G)/Long Term Evolution (LTE) network, a WiFi network, or other communications network). For example, the electronic device 407 can include, or be a part of, a mobile device (e.g., a mobile telephone), a wearable device (e.g., a network-connected or smart watch), an extended reality device (e.g., a virtual reality (VR) device, an augmented reality (AR) device, or a mixed reality (MR) device), a personal computer, a laptop computer, a tablet computer, an Internet-of-Things (IoT) device, a wireless access point, a router, a vehicle or component of a vehicle, a server computer, a robotics device, and/or other device used by a user to communicate over a wireless communications network. In some cases, the device 407 can be referred to as user equipment (UE), such as when referring to a device configured to communicate using 5G/NR, 4G/LTE, or other telecommunication standard. In some cases, the device can be referred to as a station (STA), such as when referring to a device configured to communicate using the Wi-Fi standard.

The computing system 470 includes software and hardware components that can be electrically or communicatively coupled via a bus 489 (or may otherwise be in communication, as appropriate). For example, the computing system 470 includes one or more processors 484. The one or more processors 484 can include one or more CPUs, ASICs, FPGAs, APs, GPUs, VPUs, NSPs, microcontrollers, dedicated hardware, any combination thereof, and/or other processing device/s and/or system/s. The bus 489 can be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone or a microphone array, and/or the like), and one or more output devices 480 (e.g., a display, a speaker, a printer, and/or the like).

The one or more wireless transceivers 478 can receive wireless signals (e.g., signal 488) via antenna 487 from one or more other devices, such as other user devices, network devices (e.g., base stations such as evolved Node Bs (eNBs) and/or gNodeBs (gNBs), WiFi access points (APs) such as routers, range extenders or the like, etc.), cloud networks, and/or the like. In some examples, the computing system 470 can include multiple antennas or an antenna array that can facilitate simultaneous transmit and receive functionality. Antenna 487 can be an omnidirectional antenna such that RF signals can be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 488 into a baseband or intermediate frequency and can convert the RF signals to the digital domain.

In some cases, the computing system 470 can include a coding-decoding device (or CODEC) configured to encode and/or decode data transmitted and/or received using the one or more wireless transceivers 478. In some cases, the computing system 470 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 478.

The one or more SIMs 474 can each securely store an international mobile subscriber identity (IMSI) number and related key assigned to the user of the electronic device 407. The IMSI and key can be used to identify and authenticate the subscriber when accessing a network provided by a network service provider or operator associated with the one or more SIMs 474. The one or more modems 476 can modulate one or more signals to encode information for transmission using the one or more wireless transceivers 478. The one or more modems 476 can also demodulate signals received by the one or more wireless transceivers 478 in order to decode the transmitted information. In some examples, the one or more modems 476 can include a WiFi modem, a 4G (or LTE) modem, a 5G (or NR) modem, and/or other types of modems. The one or more modems 476 and the one or more wireless transceivers 478 can be used for communicating data for the one or more SIMs 474.

The computing system 470 can also include (and/or be in communication with) one or more non-transitory machine-readable storage media or storage devices (e.g., one or more memory devices 486), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 can also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the electronic device 407 can include means for performing operations described herein. The means can include one or more of the components of the computing system 470. For example, the means for performing operations described herein may include one or more of input device(s) 472, SIM(s) 474, modems(s) 476, wireless transceiver(s) 478, output device(s) 480, DSP(s) 482, processors 484, memory device(s) 486, and/or antenna(s) 487.

In some aspects, the electronic device 407 can include means for providing joint communications and sensing as well as a means for enhancements on RF sensing measurement reports in cellular systems, for example, when multiplexing sensing and communication signals for joint communications and sensing (JCS). In some examples, any or all of these means can include the one or more wireless transceivers 478, the one or more modems 476, the one or more processors 484, the one or more DSPs 482, the one or more memory devices 486, any combination thereof, or other component(s) of the electronic device 407.

Figure 5:
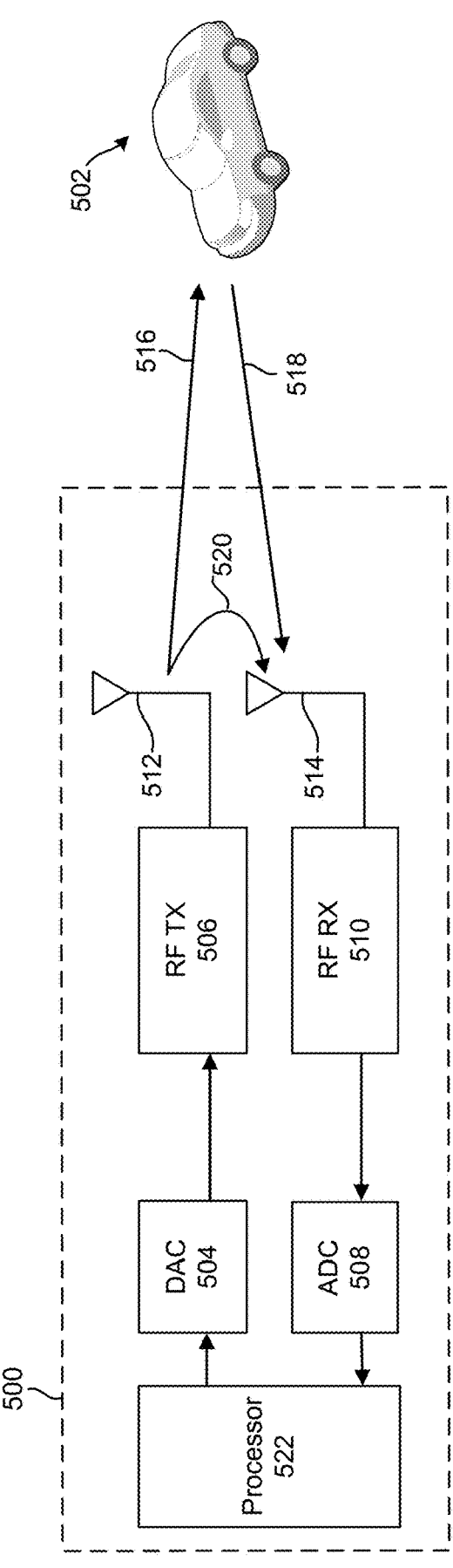
FIG. 5 is a diagram illustrating an example of a wireless device utilizing radio frequency (RF) monostatic sensing techniques, which may be employed by the disclosed systems and techniques described herein to determine one or more characteristics of a target object, in accordance with some aspects of the present disclosure.

FIG. 5 is a diagram illustrating an example of a wireless device 500 utilizing RF monostatic sensing technique for determining one or more characteristics (e.g., location, speed or velocity, heading, etc.) of a target 502 object. In particular, FIG. 5 is a diagram illustrating an example of a wireless device 500 (e.g., a transmit/receive sensing node) that utilizes RF sensing techniques (e.g., monostatic sensing) to perform one or more functions, such as detecting a presence and location of a target 502 (e.g., an object, user, or vehicle), which in this figure is illustrated in the form of a vehicle.

In some examples, the wireless device 500 can be a mobile phone, a tablet computer, a wearable device, a vehicle, an extending reality (XR) device, a computing device or component of a vehicle, or other device (e.g., device 407 of FIG. 4) that includes at least one RF interface. In some examples, the wireless device 500 can be a device that provides connectivity for a user device (e.g., for electronic device 407 of FIG. 4), such as a base station (e.g., a gNB, eNB, etc.), a wireless access point (AP), or other device that includes at least one RF interface.

In some aspects, wireless device 500 can include one or more components for transmitting an RF signal. The wireless device 500 can include at least one processor 522 for generating a digital signal or waveform. The wireless device 500 can also include a digital-to-analog converter (DAC) 504 that is capable of receiving the digital signal or waveform from the processor(s) 522 (e.g., a microprocessor), and converting the digital signal or waveform to an analog waveform. The analog signal that is the output of the DAC 504 can be provided to RF transmitter 506 for transmission. The RF transmitter 506 can be a Wi-Fi transmitter, a 5G/NR transmitter, a Bluetooth™ transmitter, or any other transmitter capable of transmitting an RF signal.

RF transmitter 506 can be coupled to one or more transmitting antennas such as Tx antenna 512. In some examples, transmit (Tx) antenna 512 can be an omnidirectional antenna that is capable of transmitting an RF signal in all directions. For example, Tx antenna 512 can be an omnidirectional Wi-Fi antenna that can radiate Wi-Fi signals (e.g., 2.4 GHz, 5 GHz, 6 GHz, etc.) in a 360-degree radiation pattern. In another example, Tx antenna 512 can be a directional antenna that transmits an RF signal in a particular direction.

In some examples, wireless device 500 can also include one or more components for receiving an RF signal. For example, the receiver lineup in wireless device 500 can include one or more receiving antennas such as a receive (Rx) antenna 514. In some examples, Rx antenna 514 can be an omnidirectional antenna capable of receiving RF signals from multiple directions. In other examples, Rx antenna 514 can be a directional antenna that is configured to receive signals from a particular direction. In further examples, the Tx antenna 512 and/or the Rx antenna 514 can include multiple antennas (e.g., elements) configured as an antenna array (e.g., a phase antenna array).

Wireless device 500 can also include an RF receiver 510 that is coupled to Rx antenna 514. RF receiver 510 can include one or more hardware components for receiving an RF waveform such as a Wi-Fi signal, a Bluetooth™ signal, a 5G/NR signal, or any other RF signal. The output of RF receiver 510 can be coupled to an analog-to-digital converter (ADC) 508. ADC 508 can be configured to convert the received analog RF waveform into a digital waveform. The digital waveform that is the output of the ADC 508 can be provided to the processor(s) 522 for processing. The processor(s) 522 (e.g., a digital signal processor (DSP)) can be configured for processing the digital waveform.

In one example, wireless device 500 can implement RF sensing techniques, for example monostatic sensing techniques, by causing a Tx waveform 516 to be transmitted from Tx antenna 512. Although Tx waveform 516 is illustrated as a single line, in some cases, Tx waveform 516 can be transmitted in all directions by an omnidirectional Tx antenna 512. In one example, Tx waveform 516 can be a Wi-Fi waveform that is transmitted by a Wi-Fi transmitter in wireless device 500. In some cases, Tx waveform 516 can correspond to a Wi-Fi waveform that is transmitted at or near the same time as a Wi-Fi data communication signal or a Wi-Fi control function signal (e.g., a beacon transmission). In some examples, Tx waveform 516 can be transmitted using the same or a similar frequency resource as a Wi-Fi data communication signal or a Wi-Fi control function signal (e.g., a beacon transmission). In some aspects, Tx waveform 516 can correspond to a Wi-Fi waveform that is transmitted separately from a Wi-Fi data communication signal and/or a Wi-Fi control signal (e.g., Tx waveform 516 can be transmitted at different times and/or using a different frequency resource).

In some examples, Tx waveform 516 can correspond to a 5G NR waveform that is transmitted at or near the same time as a 5G NR data communication signal or a 5G NR control function signal. In some examples, Tx waveform 516 can be transmitted using the same or a similar frequency resource as a 5G NR data communication signal or a 5G NR control function signal. In some aspects, Tx waveform 516 can correspond to a 5G NR waveform that is transmitted separately from a 5G NR data communication signal and/or a 5G NR control signal (e.g., Tx waveform 516 can be transmitted at different times and/or using a different frequency resource).

In some aspects, one or more parameters associated with Tx waveform 516 can be modified that may be used to increase or decrease RF sensing resolution. The parameters may include frequency, bandwidth, number of spatial streams, the number of antennas configured to transmit Tx waveform 516, the number of antennas configured to receive a reflected RF signal (e.g., Rx waveform 518) corresponding to Tx waveform 516, the number of spatial links (e.g., number of spatial streams multiplied by number of antennas configured to receive an RF signal), the sampling rate, or any combination thereof. The transmitted waveform (e.g., Tx waveform 516) and the received waveform (e.g., Rx waveform 518) can include one or more RF sensing signals, which are also referred to as radar reference signals (RSs).

In further examples, Tx waveform 516 can be implemented to have a sequence that has perfect or almost perfect autocorrelation properties. For instance, Tx waveform 516 can include single carrier Zadoff sequences or can include symbols that are similar to orthogonal frequency-division multiplexing (OFDM) Long Training Field (LTF) symbols. In some cases, Tx waveform 516 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 500 can implement RF sensing techniques by performing alternating transmit and receive functions (e.g., performing a half-duplex operation). For example, wireless device 500 can alternately enable its RF transmitter 506 to transmit the Tx waveform 516 when the RF receiver 510 is not enabled to receive (i.e. not receiving), and enable its RF receiver 510 to receive the Rx waveform 518 when the RF transmitter 506 is not enabled to transmit (i.e. not transmitting). When the wireless device 500 is performing a half-duplex operation, the wireless device 500 may transmit Tx waveform 516, which may be a radar RS (e.g., sensing signal).

In other aspects, wireless device 500 can implement RF sensing techniques by performing concurrent transmit and receive functions (e.g., performing a sub-band or full-band full-duplex operation). For example, wireless device 500 can enable its RF receiver 510 to receive at or near the same time as it enables RF transmitter 506 to transmit Tx waveform 516. When the wireless device 500 is performing a full-duplex operation (e.g., either sub-band full-duplex or full-band full-duplex), the wireless device 500 may transmit Tx waveform 516, which may be a radar RS (e.g., sensing signal).

In some examples, transmission of a sequence or pattern that is included in Tx waveform 516 can be repeated continuously such that the sequence is transmitted a certain number of times or for a certain duration of time. In some examples, repeating a pattern in the transmission of Tx waveform 516 can be used to avoid missing the reception of any reflected signals if RF receiver 510 is enabled after RF transmitter 506. In one example implementation, Tx waveform 516 can include a sequence having a sequence length L that is transmitted two or more times, which can allow RF receiver 510 to be enabled at a time less than or equal to L in order to receive reflections corresponding to the entire sequence without missing any information.

By implementing alternating or simultaneous transmit and receive functionality (e.g. half-duplex or full-duplex operation), wireless device 500 can receive signals that correspond to Tx waveform 516. For example, wireless device 500 can receive signals that are reflected from objects or people that are within range of Tx waveform 516, such as Rx waveform 518 reflected from target 502. Wireless device 500 can also receive leakage signals (e.g., Tx leakage signal 520) that are coupled directly from Tx antenna 512 to Rx antenna 514 without reflecting from any objects. For example, leakage signals can include signals that are transferred from a transmitter antenna (e.g., Tx antenna 512) on a wireless device to a receive antenna (e.g., Rx antenna 514) on the wireless device without reflecting from any objects. In some cases, Rx waveform 518 can include multiple sequences that correspond to multiple copies of a sequence that are included in Tx waveform 516. In some examples, wireless device 500 can combine the multiple sequences that are received by RF receiver 510 to improve the signal to noise ratio (SNR).

Wireless device 500 can further implement RF sensing techniques by obtaining RF sensing data associated with each of the received signals corresponding to Tx waveform 516. In some examples, the RF sensing data can include channel state information (CSI) data relating to the direct paths (e.g., leakage signal 520) of Tx waveform 516 together with data relating to the reflected paths (e.g., Rx waveform 518) that correspond to Tx waveform 516.

In some aspects, RF sensing data (e.g., CSI data) can include information that can be used to determine the manner in which an RF signal (e.g., Tx waveform 516) propagates from RF transmitter 506 to RF receiver 510. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used by the processor(s) 522 to calculate distances and angles of arrival that correspond to reflected waveforms, such as Rx waveform 518. In further examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 502) in the surrounding environment in order to detect target presence/proximity.

The processor(s) 522 of the wireless device 500 can calculate distances and angles of arrival corresponding to reflected waveforms (e.g., the distance and angle of arrival corresponding to Rx waveform 518) by utilizing signal processing, machine learning algorithms, any other suitable technique, or any combination thereof. In other examples, wireless device 500 can transmit or send the RF sensing data to at least one processor of another computing device, such as a server or base station, that can perform the calculations to obtain the distance and angle of arrival corresponding to Rx waveform 518 or other reflected waveforms.

In one example, the distance of Rx waveform 518 can be calculated by measuring the difference in time from reception of the leakage signal to the reception of the reflected signals. For example, wireless device 500 can determine a baseline distance of zero that is based on the difference from the time the wireless device 500 transmits Tx waveform 516 to the time it receives leakage signal 520 (e.g., propagation delay). The processor(s) 522 of the wireless device 500 can then determine a distance associated with Rx waveform 518 based on the difference from the time the wireless device 500 transmits Tx waveform 516 to the time it receives Rx waveform 518 (e.g., time of flight, which is also referred to as round trip time (RTT)), which can then be adjusted according to the propagation delay associated with leakage signal 520. In doing so, the processor(s) 522 of the wireless device 500 can determine the distance traveled by Rx waveform 518 which can be used to determine the presence and movement of a target (e.g., target 502) that caused the reflection.

In further examples, the angle of arrival of Rx waveform 518 can be calculated by the processor(s) 522 by measuring the time difference of arrival of Rx waveform 518 between individual elements of a receive antenna array, such as antenna 514. In some examples, the time difference of arrival can be calculated by measuring the difference in received phase at each element in the receive antenna array.

In some cases, the distance and the angle of arrival of Rx waveform 518 can be used by processor(s) 522 to determine the distance between wireless device 500 and target 502 as well as the position of the target 502 relative to the wireless device 500. The distance and the angle of arrival of Rx waveform 518 can also be used to determine presence, movement, proximity, identity, or any combination thereof, of target 502. For example, the processor(s) 522 of the wireless device 500 can utilize the calculated distance and angle of arrival corresponding to Rx waveform 518 to determine that the target 502 is moving towards wireless device 500.

As noted above, wireless device 500 can include mobile devices (e.g., IoT devices, smartphones, laptops, tablets, etc.) or other types of devices. In some examples, wireless device 500 can be configured to obtain device location data and device orientation data together with the RF sensing data. In some instances, device location data and device orientation data can be used to determine or adjust the distance and angle of arrival of a reflected signal such as Rx waveform 518. For example, wireless device 500 may be set on the ground facing the sky as a target 502 (e.g., a vehicle) moves towards it during the RF sensing process. In this instance, wireless device 500 can use its location data and orientation data together with the RF sensing data to determine the direction that the target 502 is moving.

In some examples, device position data can be gathered by wireless device 500 using techniques that include RTT measurements, time of arrival (TOA) measurements, time difference of arrival (TDOA) measurements, passive positioning measurements, angle of arrival (AOA) measurements, angle of departure (AoD) measurements, received signal strength indicator (RSSI) measurements, CSI data, using any other suitable technique, or any combination thereof. In further examples, device orientation data can be obtained from electronic sensors on the wireless device 500, such as a gyroscope, an accelerometer, a compass, a magnetometer, a barometer, any other suitable sensor, or any combination thereof.

Figure 6:
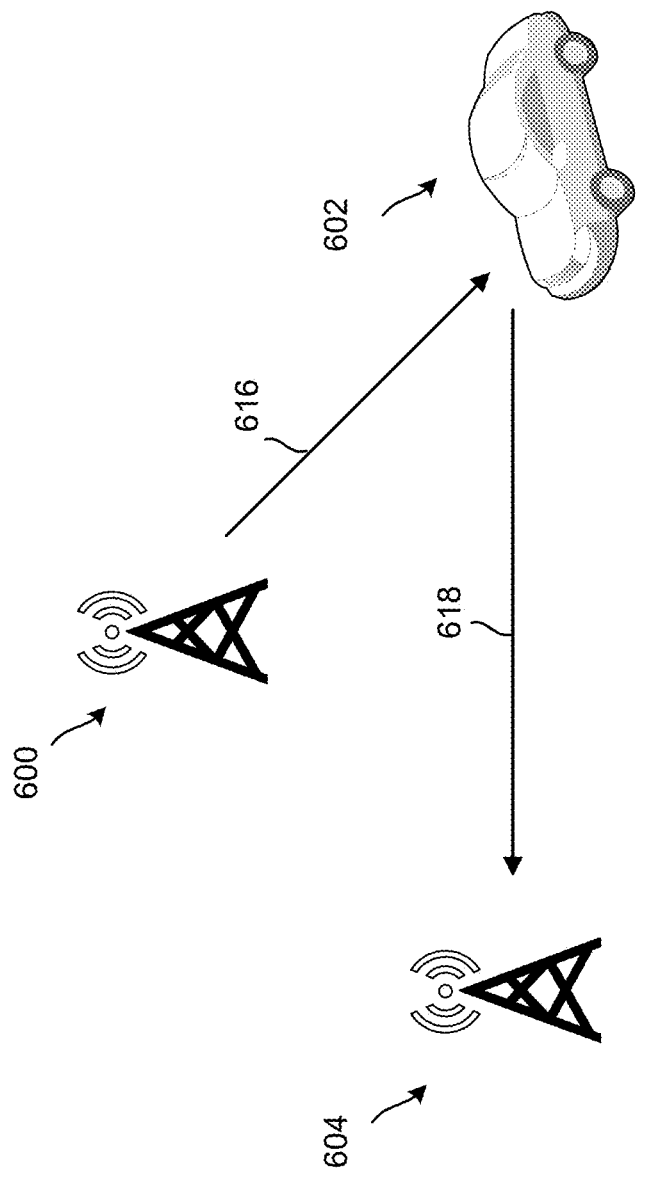
FIG. 6 is a diagram illustrating an example of a receiver utilizing RF bistatic sensing techniques with one transmitter, which may be employed by the disclosed systems and techniques described herein to determine one or more characteristics of a target object, in accordance with some aspects of the present disclosure.

FIG. 6 is a diagram illustrating an example of a receiver 604 utilizing RF bistatic sensing techniques with one transmitter 600 for determining one or more characteristics (e.g., location, speed or velocity, heading, etc.) of a target 602 object. For example, the receiver 604 can use the RF bistatic sensing to detect a presence and location of a target 602 (e.g., an object, user, or vehicle), which is illustrated in the form of a vehicle in FIG. 6. In one example, the receiver 604 may be in the form of a base station, such as a gNB.

The bistatic radar system of FIG. 6 includes a transmitter 600 (e.g., a transmit sensing node), which in this figure is depicted to be in the form of a base station (e.g., gNB), and a receiver 604 (e.g., a receive sensing node) that are separated by a distance comparable to the expected target distance. As compared to the monostatic system of FIG. 5, the transmitter 600 and the receiver 604 of the bistatic radar system of FIG. 6 are located remote from one another. Conversely, monostatic radar is a radar system (e.g., the system of FIG. 5) comprising a transmitter (e.g., the RF transmitter 506 of wireless device 500 of FIG. 5) and a receiver (e.g., the RF receiver 510 of wireless device 500 of FIG. 5) that are co-located with one another.

An advantage of bistatic radar (or more generally, multistatic radar, which has more than one receiver) over monostatic radar is the ability to collect radar returns reflected from a scene at angles different than that of a transmitted pulse. This can be of interest to some applications (e.g., vehicle applications, scenes with multiple objects, military applications, etc.) where targets may reflect the transmitted energy in many directions (e.g., where targets are specifically designed to reflect in many directions), which can minimize the energy that is reflected back to the transmitter. It should be noted that, in one or more examples, a monostatic system can coexist with a multistatic radar system, such as when the transmitter also has a co-located receiver.

In some examples, the transmitter 600 and/or the receiver 604 of FIG. 6 can be a mobile phone, a tablet computer, a wearable device, a vehicle, or other device (e.g., device 407 of FIG. 4) that includes at least one RF interface. In some examples, the transmitter 600 and/or the receiver 604 can be a device that provides connectivity for a user device (e.g., for IoT device 407 of FIG. 4), such as a base station (e.g., a gNB, eNB, etc.), a wireless access point (AP), or other device that includes at least one RF interface.

In some aspects, transmitter 600 can include one or more components for transmitting an RF signal. The transmitter 600 can include at least one processor (e.g., the at least one processor 522 of FIG. 5) that is capable of determining signals (e.g., determining the waveforms for the signals) to be transmitted. The transmitter 600 can also include an RF transmitter (e.g., the RF transmitter 506 of FIG. 5) for transmission of a Tx signal comprising Tx waveform 616. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter can be coupled to one or more transmitting antennas, such as a Tx antenna (e.g., the TX antenna 512 of FIG. 5). In some examples, a Tx antenna can be an omnidirectional antenna that is capable of transmitting an RF signal in all directions, or a directional antenna that transmits an RF signal in a particular direction. In some examples, the Tx antenna may include multiple antennas (e.g., elements) configured as an antenna array.

The receiver 604 can include one or more components for receiving an RF signal. For example, the receiver 604 may include one or more receiving antennas, such as an Rx antenna (e.g., the Rx antenna 514 of FIG. 5). In some examples, an Rx antenna can be an omnidirectional antenna capable of receiving RF signals from multiple directions, or a directional antenna that is configured to receive signals from a particular direction. In further examples, the Rx antenna can include multiple antennas (e.g., elements) configured as an antenna array.

The receiver 604 may also include an RF receiver (e.g., RF receiver 510 of FIG. 5) coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the at least one processor 522 of FIG. 5). The processor(s) may be configured to process a received waveform (e.g., Rx waveform 618).

In one or more examples, transmitter 600 can implement RF sensing techniques, for example bistatic sensing techniques, by causing a Tx waveform 616 to be transmitted from a Tx antenna. It should be noted that although the Tx waveform 616 is illustrated as a single line, in some cases, the Tx waveform 616 can be transmitted in all directions by an omnidirectional Tx antenna.

In one or more aspects, one or more parameters associated with the Tx waveform 616 may be used to increase or decrease RF sensing resolution. The parameters may include frequency, bandwidth, number of spatial streams, the number of antennas configured to transmit Tx waveform 616, the number of antennas configured to receive a reflected RF signal (e.g., Rx waveform 618) corresponding to the Tx waveform 616, the number of spatial links (e.g., number of spatial streams multiplied by number of antennas configured to receive an RF signal), the sampling rate, or any combination thereof. The transmitted waveform (e.g., Tx waveform 616) and the received waveform (e.g., the Rx waveform 618) can include one or more radar RF sensing signals (also referred to as RF sensing RSs).

During operation, the receiver 604 (e.g., which operates as a receive sensing node) can receive signals that correspond to Tx waveform 616, which is transmitted by the transmitter 600 (e.g., which operates as a transmit sensing node). For example, the receiver 604 can receive signals that are reflected from objects or people that are within range of the Tx waveform 616, such as Rx waveform 618 reflected from target 602. In some cases, the Rx waveform 618 can include multiple sequences that correspond to multiple copies of a sequence that are included in the Tx waveform 616. In some examples, the receiver 604 may combine the multiple sequences that are received to improve the SNR.

In some examples, RF sensing data can be used by at least one processor within the receiver 604 to calculate distances, angles of arrival, or other characteristics that correspond to reflected waveforms, such as the Rx waveform 618. In other examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 602) in the surrounding environment in order to detect target presence/proximity.

The processor(s) of the receiver 604 can calculate distances and angles of arrival corresponding to reflected waveforms (e.g., the distance and angle of arrival corresponding to the Rx waveform 618) by using signal processing, machine learning algorithms, any other suitable technique, or any combination thereof. In other examples, the receiver 604 can transmit or send the RF sensing data to at least one processor of another computing device, such as a server, that can perform the calculations to obtain the distance and angle of arrival corresponding to the Rx waveform 618 or other reflected waveforms.

In one or more examples, the angle of arrival of the Rx waveform 618 can be calculated by a processor(s) of the receiver 604 by measuring the time difference of arrival of the Rx waveform 618 between individual elements of a receive antenna array of the receiver 604. In some examples, the time difference of arrival can be calculated by measuring the difference in received phase at each element in the receive antenna array.

In some cases, the distance and the angle of arrival of the Rx waveform 618 can be used by the processor(s) of the receiver 604 to determine the distance between the receiver 604 and the target 602 as well as the position of target 602 relative to the receiver 604. The distance and the angle of arrival of the Rx waveform 618 can also be used to determine presence, movement, proximity, identity, or any combination thereof, of the target 602. For example, the processor(s) of the receiver 604 may use the calculated distance and angle of arrival corresponding to the Rx waveform 618 to determine that the target 602 is moving towards the receiver 604.

Figure 7:
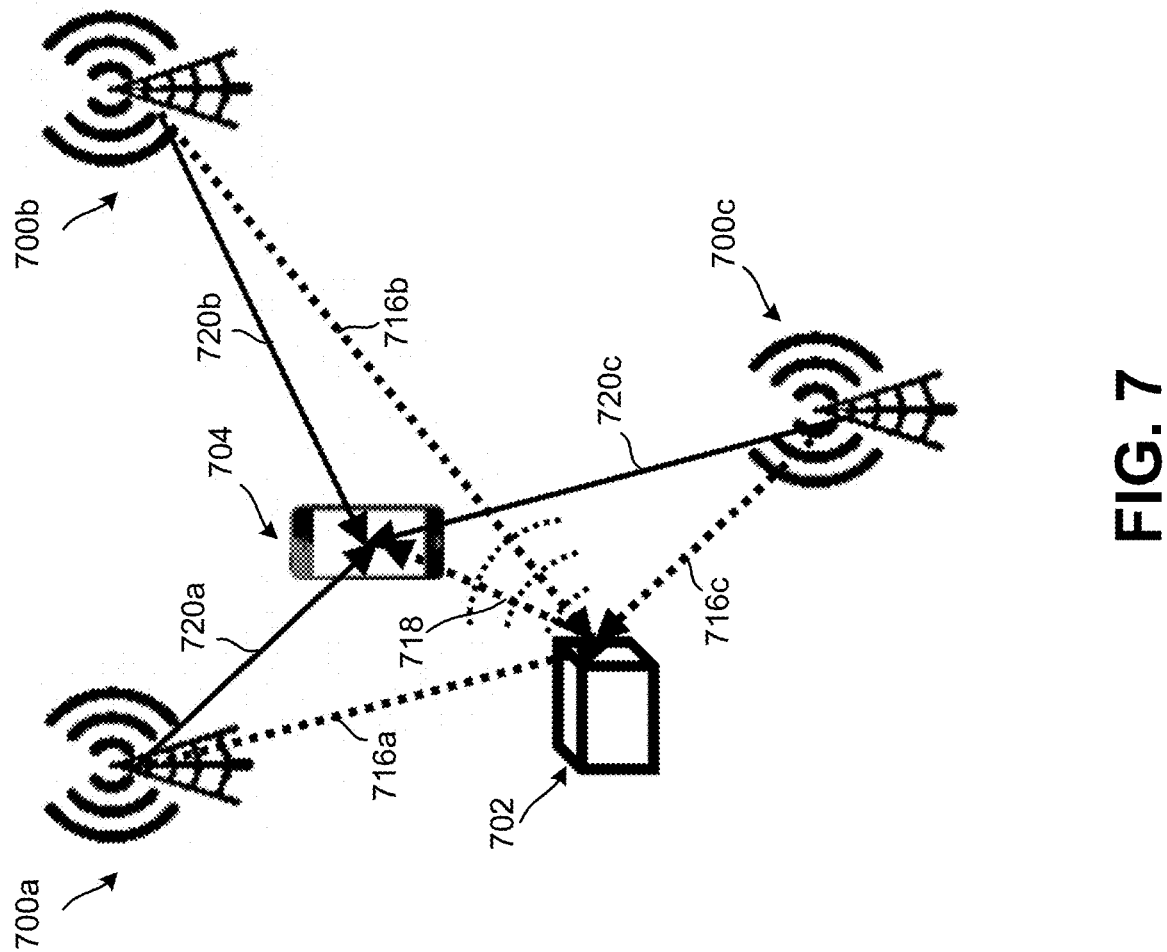
FIG. 7 is a diagram illustrating an example of a receiver utilizing RF bistatic sensing techniques with multiple transmitters, which may be employed by the disclosed systems and techniques described herein to determine one or more characteristics of a target object, in accordance with some aspects of the present disclosure.

FIG. 7 is a diagram illustrating an example of a receiver 704, in the form of a smart phone, utilizing RF bistatic sensing techniques with multiple transmitters (including a transmitter 700a, a transmitter 700b, and a transmitter 700c), which may be employed to determine one or more characteristics (e.g., location, velocity or speed, heading, etc.) of a target 702 object. For example, the receiver 704 may use RF bistatic sensing to detect a presence and location of a target 702 (e.g., an object, user, or vehicle). The target 702 is depicted in FIG. 7 in the form of an object that does not have communications capabilities (which can be referred to as a device-free object), such as a person, a vehicle (e.g., a vehicle without the ability to transmit and receive messages, such as using C-V2X or DSRC protocols), or other device-free object. The bistatic radar system of FIG. 7 is similar to the bistatic radar system of FIG. 6, except that the bistatic radar system of FIG. 7 has multiple transmitters 700a, 700b, 700c, while the bistatic radar system of FIG. 6 has only one transmitter 600.

The bistatic radar system of FIG. 7 includes multiple transmitters 700a, 700b, 700c (e.g., transmit sensing nodes), which are illustrated to be in the form of base stations. The bistatic radar system of FIG. 7 also includes a receiver 704 (e.g., a receive sensing node), which is depicted in the form of a smart phone. The each of the transmitters 700a, 700b, 700c is separated from the receiver 704 by a distance comparable to the expected distance from the target 702. Similar to the bistatic system of FIG. 6, the transmitters 700a, 700b, 700c and the receiver 704 of the bistatic radar system of FIG. 7 are located remote from one another.

In one or more examples, the transmitters 700a, 700b, 700c and/or the receiver 704 may each be a mobile phone, a tablet computer, a wearable device, a vehicle (e.g., a vehicle configured to transmit and receive communications according to C-V2X, DSRC, or other communication protocol), or other device (e.g., device 407 of FIG. 4) that includes at least one RF interface. In some examples, the transmitters 700a, 700b, 700c and/or the receiver 704 may each be a device that provides connectivity for a user device (e.g., for IoT device 407 of FIG. 4), such as a base station (e.g., a gNB, eNB, etc.), a wireless access point (AP), or other device that includes at least one RF interface.

The transmitters 700a, 700b, 700c may include one or more components for transmitting an RF signal. Each of the transmitters 700a, 700b, 700c may include at least one processor (e.g., the processor(s) 522 of FIG. 5) that is capable of determining signals (e.g., determining the waveforms for the signals) to be transmitted. Each of the transmitters 700a, 700b, 700c can also include an RF transmitter (e.g., the RF transmitter 506 of FIG. 5) for transmission of Tx signals comprising Tx waveforms 716a, 716b, 716c, 720a, 720b, 720c. In one or more examples, Tx waveforms 716a, 716b, 716c are RF sensing signals, and Tx waveforms 720a, 720b, 720c are communications signals. In one or more examples, the Tx waveforms 720a, 720b, 720c are communications signals that may be used for scheduling transmitters (e.g., transmitters 700a, 700b, 700c) and receivers (e.g., receiver 704) for performing RF sensing of a target (e.g., target 702) to obtain location information regarding the target. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter may be coupled to one or more transmitting antennas, such as a Tx antenna (e.g., the TX antenna 512 of FIG. 5). In one or more examples, a Tx antenna can be an omnidirectional antenna that is capable of transmitting an RF signal in all directions, or a directional antenna that transmits an RF signal in a particular direction. The Tx antenna may include multiple antennas (e.g., elements) configured as an antenna array.

The receiver 704 of FIG. 7 may include one or more components for receiving an RF signal. For example, the receiver 704 can include one or more receiving antennas, such as an Rx antenna (e.g., the Rx antenna 514 of FIG. 5). In one or more examples, an Rx antenna can be an omnidirectional antenna capable of receiving RF signals from multiple directions, or a directional antenna that is configured to receive signals from a particular direction. In some examples, the Rx antenna may include multiple antennas (e.g., elements) configured as an antenna array (e.g., a phase antenna array).

The receiver 704 can also include an RF receiver (e.g., RF receiver 510 of FIG. 5) coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the processor(s) 522 of FIG. 5). The processor(s) may be configured to process a received waveform (e.g., Rx waveform 718, which is a reflection (echo) RF sensing signal).

In some examples, the transmitters 700a, 700b, 700c can implement RF sensing techniques, for example bistatic sensing techniques, by causing Tx waveforms 716a, 716b, 716c (e.g., radar sensing signals) to be transmitted from a Tx antenna associated with each of the transmitters 700a, 700b, 700c. Although the Tx waveforms 716a, 716b, 716c are illustrated as single lines, in some cases, the Tx waveforms 716a, 716b, 716c may be transmitted in all directions (e.g., by an omnidirectional Tx antenna associated with each of the transmitters 700a, 700b, 700c).

In one or more aspects, one or more parameters associated with the Tx waveforms 716a, 716b, 716c may be used to increase or decrease RF sensing resolution. The parameters can include, but are not limited to, frequency, bandwidth, number of spatial streams, the number of antennas configured to transmit Tx waveforms 716a, 716b, 716c, the number of antennas configured to receive a reflected (echo) RF signal (e.g., Rx waveform 718) corresponding to each of the Tx waveforms 716a, 716b, 716c, the number of spatial links (e.g., number of spatial streams multiplied by number of antennas configured to receive an RF signal), the sampling rate, or any combination thereof. The transmitted waveforms (e.g., Tx waveforms 716a, 716b, 716c) and the received waveforms (e.g., the Rx waveform 718) may include one or more radar RF sensing signals (also referred to as RF sensing RSs). It should be noted that although only one reflected sensing signal (e.g., Rx waveform 718) is shown in FIG. 7, it is understood that a separate reflection (echo) sensing signal will be generated by each sensing signal (e.g., Tx waveforms 716a, 716b, 716c) reflecting off of the target 702.

During operation of the system of FIG. 7, the receiver 704 (e.g., which operates as a receive sensing node) can receive signals that correspond to Tx waveforms 716a, 716b, 716c, which are transmitted by the transmitters 700a, 700b, 700c (e.g., which each operate as a transmit sensing node). The receiver 704 can receive signals that are reflected from objects or people that are within range of the Tx waveforms 716a, 716b, 716c, such as Rx waveform 718 reflected from the target 702. In one or more examples, the Rx waveform 718 may include multiple sequences that correspond to multiple copies of a sequence that are included in its corresponding Tx waveform 716a, 716b, 716c. In some examples, the receiver 704 may combine the multiple sequences that are received to improve the SNR.

In some examples, RF sensing data can be used by at least one processor within the receiver 704 to calculate distances, angles of arrival (AOA), TDOA, angle of departure (AoD), or other characteristics that correspond to reflected waveforms (e.g., Rx waveform 718). In further examples, RF sensing data can also be used to detect motion, determine location, detect changes in location or motion patterns, or any combination thereof. In one or more examples, the distance and angle of arrival of the reflected signals can be used to identify the size, position, movement, and/or orientation of targets (e.g., target 702) in order to detect target presence/proximity.

The processor(s) of the receiver 704 can calculate distances and angles of arrival corresponding to reflected waveforms (e.g., the distance and angle of arrival corresponding to the Rx waveform 718) by using signal processing, machine learning algorithms, any other suitable technique, or any combination thereof. In one or more examples, the receiver 704 can transmit or send the RF sensing data to at least one processor of another computing device, such as a server, that can perform the calculations to obtain the distance and angle of arrival corresponding to the Rx waveform 718 or other reflected waveforms (not shown).

In one or more examples, a processor(s) of the receiver 704 can calculate the angle of arrival (AOA) of the Rx waveform 718 by measuring the TDOA of the Rx waveform 718 between individual elements of a receive antenna array of the receiver 704. In some examples, the TDOA can be calculated by measuring the difference in received phase at each element in the receive antenna array. In one illustrative example, to determine TDOA, the processor(s) can determine the difference time of arrival of the Rx waveform 718 to the receive antenna array elements, using one of them as a reference. The time difference is proportional to distance differences.

In some cases, the processor(s) of the receiver 704 can use the distance, the AOA, the TDOA, other measured information (e.g., AoD, etc.), any combination thereof, of the Rx waveform 718 to determine the distance between the receiver 704 and the target 702, and determine the position of target 702 relative to the receiver 704. In one example, the processor(s) can apply a multilateration or other location-based algorithm using the distance, AOA, and/or TDOA information as input to determine a position (e.g., 3D position) of the target 702. In other examples, the processor(s) can use the distance, the AOA, and/or the TDOA of the Rx waveform 718 to determine a presence, movement (e.g., velocity or speed, heading or direction or movement, etc.), proximity, identity, any combination thereof, or other characteristic of the target 702. For instance, the processor(s) of the receiver 704 may use the distance, the AOA, and/or the TDOA corresponding to the Rx waveform 718 to determine that the target is moving towards the receiver 704.

Figure 8:
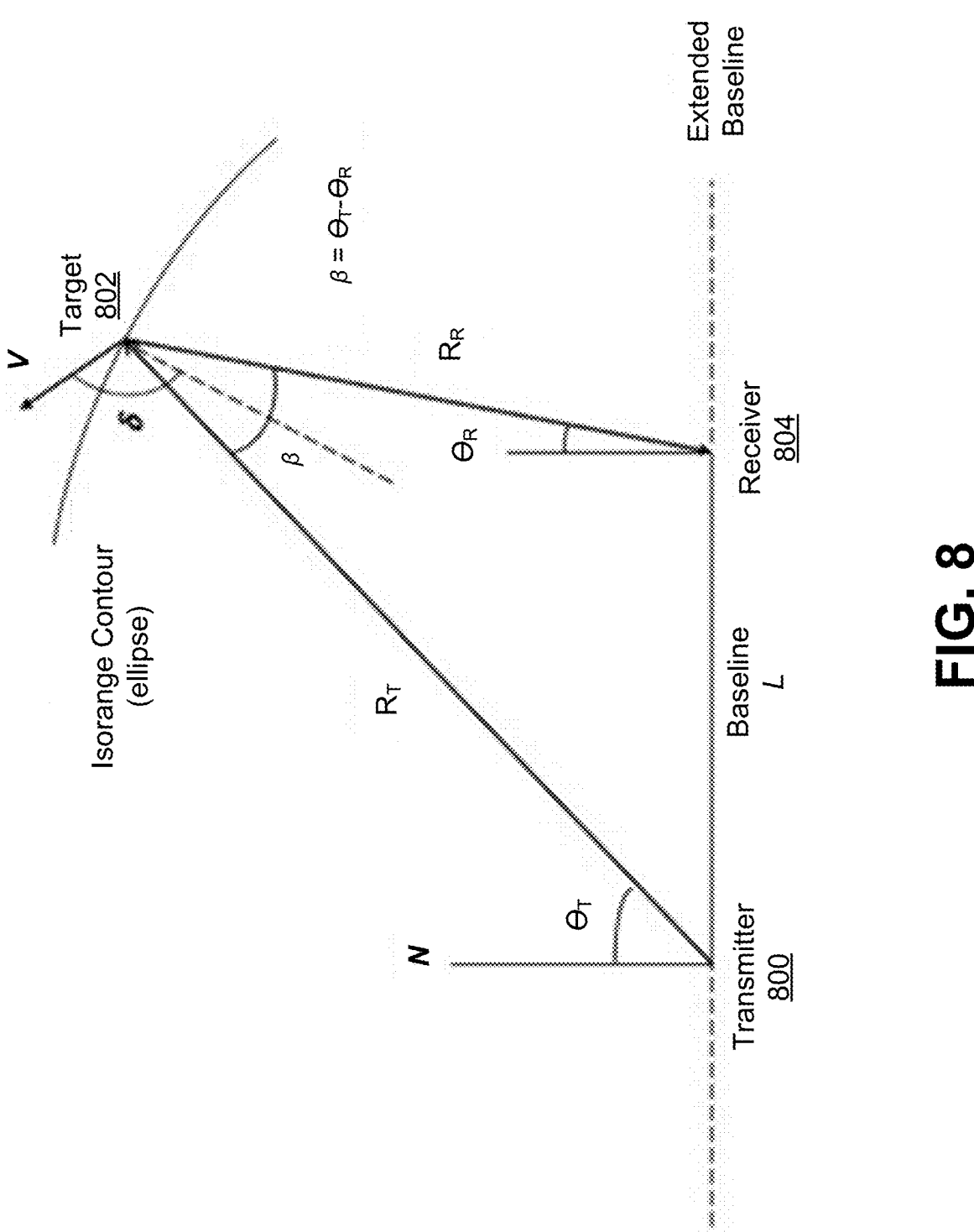
FIG. 8 is a diagram illustrating an example geometry for bistatic (or monostatic) sensing, in accordance with some aspects of the present disclosure.

FIG. 8 is a diagram illustrating geometry for bistatic (or monostatic) sensing. FIG. 8 shows a bistatic radar North-reference coordinate system in two-dimensions. In particular, FIG. 8 shows a coordinate system and parameters defining bistatic radar operation in a plane (referred to as a bistatic plane) containing a transmitter 800, a receiver 804, and a target 802. A bistatic triangle lies in the bistatic plane. The transmitter 800, the target 802, and the receiver 804 are shown in relation to one another. The transmitter 800 and the receiver 804 are separated by a baseline distance L. The extended baseline is defined as continuing the baseline distance L beyond either the transmitter 800 or the receiver 804. The target 802 and the transmitter 800 are separated by a distance $R_T$, and the target 802 and the receiver 804 are separated by a distance $R_R$.

Angles $\theta_T$ and $\theta_R$ are, respectively, the transmitter 800 and receiver 804 look angles, which are taken as positive when measured clockwise from North (N). The angles $\theta_T$ and $\theta_R$ are also referred to as angles of arrival (AOA) or lines of sight (LOS). A bistatic angle ($\beta$) is the angle subtended between the transmitter 800, the target 802, and the receiver 804 in the radar. In particular, the bistatic angle is the angle between the transmitter 800 and the receiver 804 with the vertex located at the target 802. The bistatic angle is equal to the transmitter 800 look angle minus the receiver 804 look angle $\theta_R$ (e.g., $\beta=\theta_T-\theta_R$).

When the bistatic angle is exactly zero (0), the radar is considered to be a monostatic radar; when the bistatic angle is close to zero, the radar is considered to be pseudo-monostatic; and when the bistatic angle is close to 180 degrees, the radar is considered to be a forward scatter radar. Otherwise, the radar is simply considered to be, and referred to as, a bistatic radar. The bistatic angle ($\beta$) can be used in determining the radar cross section of the target.

Figure 9:
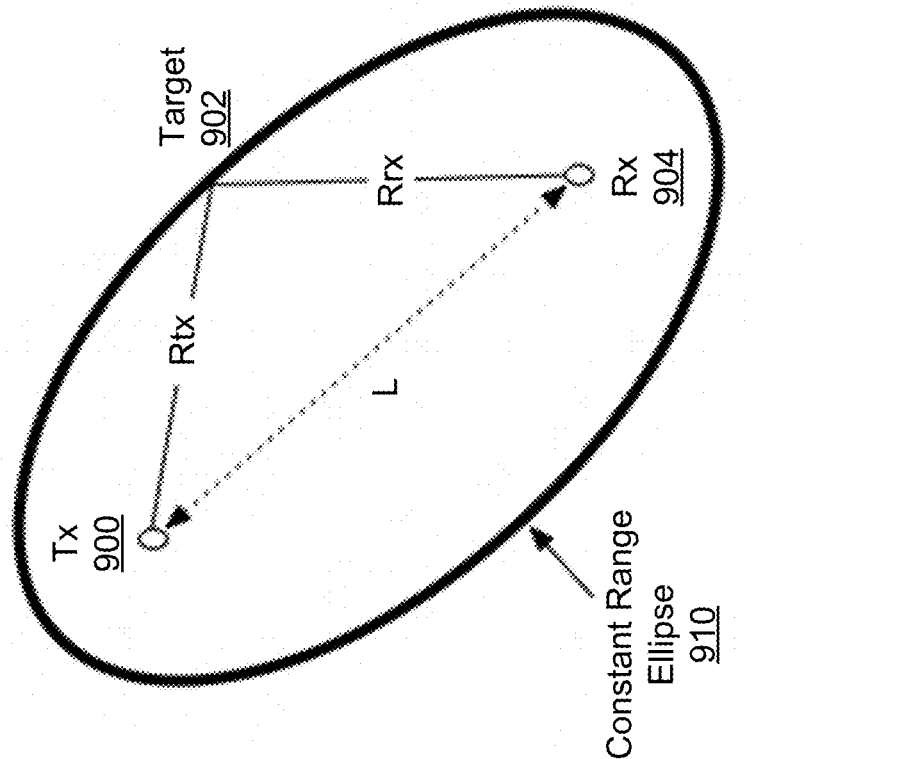
FIG. 9 is a diagram illustrating a bistatic range of bistatic sensing, in accordance with some aspects of the present disclosure.

FIG. 9 is a diagram illustrating an example of a bistatic range 910 of bistatic sensing. In this figure, a transmitter (Tx) 900, a target 902, and a receiver (Rx) 904 of a radar are shown in relation to one another. The transmitter 900 and the receiver 904 are separated by a baseline distance L, the target 902 and the transmitter 900 are separated by a distance Rtx, and the target 902 and the receiver 904 are separated by a distance Rrx.

Bistatic range 910 (shown as an ellipse) refers to the measurement range made by radar with a separate transmitter 900 and receiver 904 (e.g., the transmitter 900 and the receiver 904 are located remote from one another). The receiver 904 measures the time of arrival from when the signal is transmitted by the transmitter 900 to when the signal is received by the receiver 904 from the transmitter 900 via the target 902. The bistatic range 910 defines an ellipse of constant bistatic range, referred to an iso-range contour, on which the target 902 lies, with foci centered on the transmitter 900 and the receiver 904. If the target 902 is at range Rrx from the receiver 904 and range Rtx from the transmitter 900, and the receiver 904 and the transmitter 900 are located a distance L apart from one another, then the bistatic range is equal to Rrx+Rtx−L. It should be noted that motion of the target 902 causes a rate of change of bistatic range, which results in bistatic Doppler shift.

Generally, constant bistatic range points draw an ellipsoid, with the transmitter 900 and the receiver 904 positions as the focal points. The bistatic iso-range contours are where the ground slices the ellipsoid. When the ground is flat, this intercept forms an ellipse (e.g., bistatic range 910). Note that except when the two platforms have equal altitude, these ellipses are not centered on a specular point.

Figure 10:
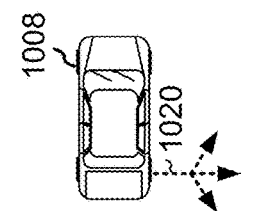
FIG. 10 is a diagram illustrating an example of devices involved in wireless communications (e.g., sidelink communications), in accordance with some aspects of the present disclosure.

FIG. 10 illustrates an example 1000 of wireless communication between devices based on sidelink communications. The communication may be based on a slot structure (e.g., the slot structure as shown in FIG. 3). For example, transmitting UE 1002 may transmit a transmission 1014, e.g., comprising a control channel and/or a corresponding data channel, that may be received by receiving UEs 1004, 1006, 1008. At least one UE may be in the form of an autonomous vehicle or an unmanned aerial vehicle. A control channel may include information for decoding a data channel and may also be used by receiving device to avoid interference by refraining from transmitting on the occupied resources during a data transmission. The number of transmission time intervals (TTIs), as well as the RBs, that will be occupied by the data transmission, may be indicated in a control message from the transmitting device. The UEs 1002, 1004, 1006, 1008 may each be capable of operating as a transmitting device in addition to operating as a receiving device. Thus, UEs 1006, 1008 are illustrated as transmitting transmissions 1016, 1020. The transmissions 1014, 1016, 1020 (and 1018 by a network device 1007, such as a roadside unit) may be broadcast or multicast to nearby devices. For example, UE 1014 may transmit communication intended for receipt by other UEs within a range 1001 of UE 1014. Additionally/alternatively, network device 1007 may receive communication from and/or transmit communication 1018 to UEs 1002, 1004, 1006, 1008. UEs 1002, 1004, 1006, 1008 or network device 1007 may include a detection component. UEs 1002, 1004, 1006, 1008 or network device 1007 may also include a vehicle-based safety message or mitigation component.

Figure 11:
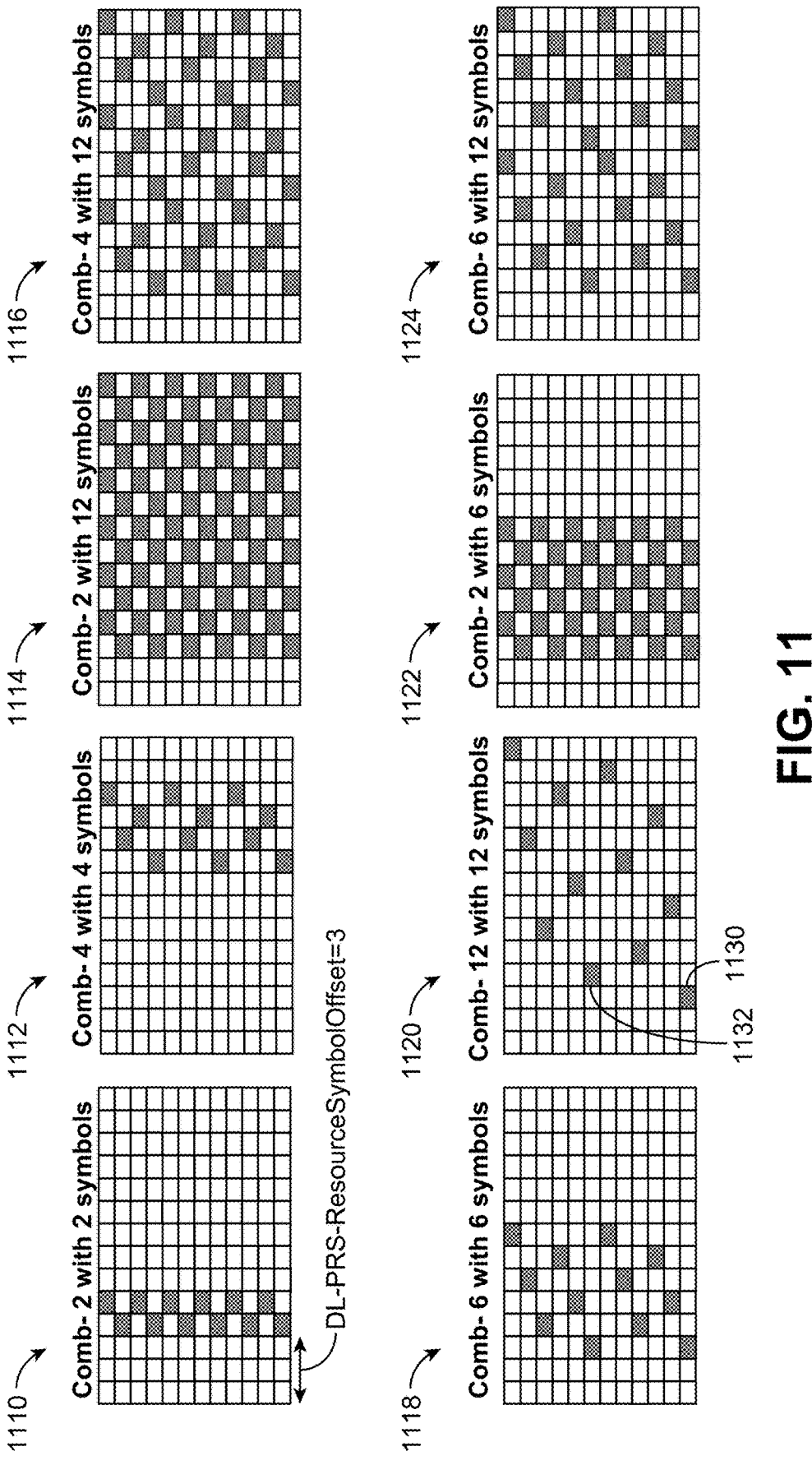
FIG. 11 is a diagram illustrating examples of existing comb structures for reference signals.

Examples of comb structures for reference signals (e.g., a PRS, SRS, etc.) are shown in FIG. 11. For example, the comb structure 1110 is a comb-2 structure with two symbols (denoted as a comb-2/2-symbol structure). According to the comb-2/2-symbol structure of the comb structure 1110, every alternate symbol is assigned to the reference signal resources. The comb patterns in FIG. 11 are for one Transmission-Reception Point (TRP). A summary of the comb structures 1110, 1112, 1114, 1116, 1118, 1120, 1122, and 1124 are provided in Table 2 below:

TABLE 2

| | 2-Symbols | 4-Symbols | 6-Symbols | 12-Symbols |
|---|---|---|---|---|
| Comb-2 | {0, 1} | {0, 1, 0, 1} | {0, 1, 0, 1, 0, 1} | {0, 1, 0, 1, 0, 1, 0, 1, 0, 1, 0, 1} |
| Comb-4 | N/A | {0, 2, 1, 3} | N/A | {0, 2, 1, 3, 0, 2, 1, 3, 0, 2, 1, 3} |
| Comb-6 | N/A | N/A | {0, 3, 1, 4, 2, 5} | {0, 3, 1, 4, 2, 5, 0, 1, 3, 4, 2, 5} |
| Comb-12 | N/A | N/A | N/A | {0, 6, 3, 9, 1, 7, 4, 10, 2, 8, 5, 11} |

Figure 12:
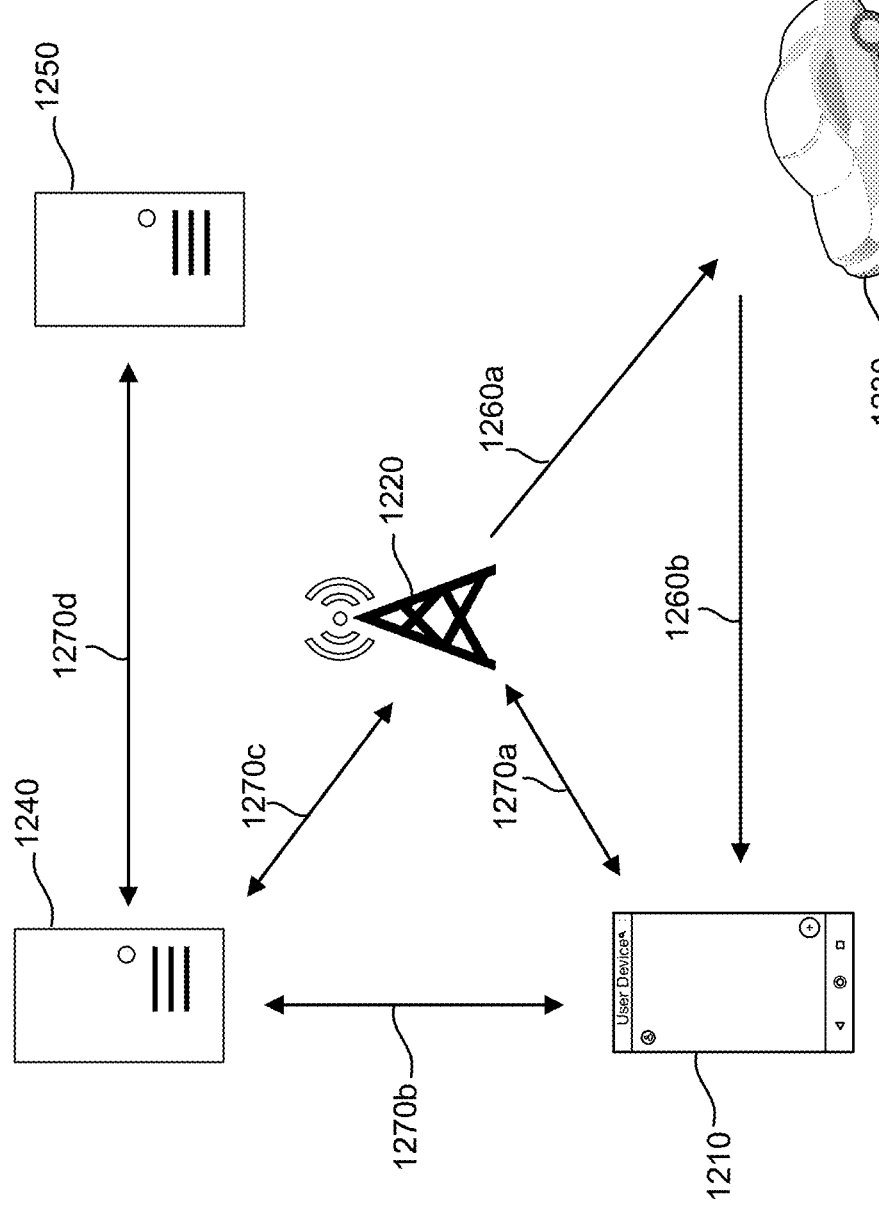
FIG. 12 is a diagram illustrating an example of a system for enhancements on RF sensing measurement reports in cellular systems, where the system is performing bistatic sensing of a target, in accordance with some aspects of the present disclosure.

As previously noted, systems and techniques are described herein that apply solutions associated with enhancements on RF sensing measurement reports in cellular systems. FIG. 12 is a diagram illustrating an example of a system 1200 for applying solutions (e.g., methods or rules) for enhancements on RF sensing measurement reports in cellular systems. In FIG. 12, the system 1200 is shown to include a network device 1210 in the form of a UE. The network device 1210 (e.g., UE) can operate as a radar Rx for sensing purposes. Also shown is a network device 1220 in the form of a base station (e.g., gNB or a portion of a gNB, such as a CU, DU, RU, Near-RT RIC, Non-RT RIC, etc.). The network device 1220 (e.g., gNB) can operate as a radar Tx for sensing purposes. The system 1200 also includes a plurality of network entities 1240, 1250, where network entity 1240 is in the form of a radar server and network entity 1250 is in the form of a location server.

The system 1200 may include more or less network devices and/or more or less network entities, than as shown in FIG. 12. In addition, the system 1200 may include different types of network devices (e.g., vehicles) and/or different types of network entities (e.g., network servers) than as shown in FIG. 12. Also, a UE may be employed as the radar Tx instead of a base station (e.g., gNB) as is shown in FIG. 12. In addition, in one or more examples, the network device 1210 (e.g., UE) may be equipped with heterogeneous capability, which may include, but is not limited to, 4G/5G cellular connectivity, GPS capability, camera capability, radar capability, and/or LIDAR capability. The network devices 1210, 1220 and network entities 1240, 1250 may be capable of performing wireless communications with each other via communications signals (e.g., signals 1270a, 1270b, 1270c, 1270d).

In one or more examples, the network devices 1210, 1220 may be capable of transmitting and receiving sensing signals of some kind (e.g., camera, RF sensing signals, optical sensing signals, etc.). In some cases, the network devices 1210, 1220 may transmit and receive sensing signals (e.g., RF sensing signals 1260a, 1260b) for using one or more sensors to detect nearby targets (e.g., target 1230, which is in the form of a vehicle). In some cases, the network devices 1210, 1220 can detect nearby targets based on one or more images or frames captured using one or more cameras.

The network device 1220, which may operate as a radar Tx, may perform RF sensing (e.g., bistatic sensing or monostatic sensing) of at least one target (e.g., target 1230) to obtain RF sensing measurements (e.g., Doppler, RTT, TOA, and/or TDOA measurements) of the target(s) (e.g., target 1230). The RF sensing measurements of the target(s) (e.g., target 1230) can be used (e.g., by at least one processor(s) of at least one of the network devices 1210, 1220 and/or at least one of the network entities 1240, 1250) to determine one or more characteristics (e.g., speed such as radial speed, location, distance, movement, heading, size, and/or other characteristics) of the target(s) (e.g., target 1230). Radial speed (also referred to as radial velocity) refers to the speed (or velocity) of a target object along the line of sight from an observing device (e.g., a network device 1210, 1220, network entity 1240, 1250, or other device) to the target object (e.g., along a radius vector to the target object).

As previously mentioned, generally, sensing involves monitoring moving targets (e.g., target 1230) with different motions (e.g., a moving car or pedestrian, a body motion of a person, such as breathing, and/or other micro-motions related to a target). Doppler, which measures the phase variation in a signal and is indicative of motion, is an important characteristic for sensing of a target (e.g., target 1230). As such, in order to obtain an accurate estimation of the motion of the target, the phase of the signal should be continuous (e.g., the signal should maintain phase continuity).

During operation of the system 1200, for example when performing bistatic sensing of a target (e.g., target 1230), a network device 1220 (e.g., base station), operating as a radar Tx, may transmit an RF sensing signal 1260a towards the target (e.g., target 1230). The RF sensing signal 1260a may be included within communication signals and sensing signals multiplexed (e.g., via time division multiplexing and/or frequency division multiplexing) together for joint communications and sensing purposes. The sensing signal 1260a can reflect off of the target (e.g., target 1230) to produce an RF reflection sensing signal 1260b, which may be reflected towards network device 1210 (e.g., UE). The network device 1210 (e.g., UE), operating as a radar Rx, can receive the reflection sensing signal 1260b. After the network device (e.g., UE) receives the reflection sensing signal 1260b, the network device (e.g., UE) can obtain measurements (e.g., Doppler, RTT, TOA, and/or TDOA measurements) of the reflection sensing signal 1260b. At least one processor (e.g., processor 1910 of FIG. 19) of at least one of the network devices 1210, 1220 and/or at least one of the network entities 1240, 1250 may then determine or compute the characteristics (e.g., speed, location, distance, movement, heading, size, etc.) of the target (e.g., target 1230) by using sensing measurements (e.g., Doppler, RTT, TOA, and/or TDOA measurements) from the received reflection sensing signal 1260b.

In some examples, the network device 1210 (e.g., UE) may transmit the measurements (e.g., Doppler, RTT, TOA, and/or TDOA measurements) and/or determined characteristics (e.g., speed, location, distance, movement, heading, size, etc.) of the target (e.g., target 1230) to the network device 1220 (e.g., base station) and/or network entity 1240 (e.g., radar server) via communication signals 1270a, 1270b. The network device 1220 (e.g., base station) and/or network entity 1240 (e.g., radar server) may then transmit the measurements (e.g., Doppler, RTT, TOA, and/or TDOA measurements) and/or determined characteristics (e.g., speed, location, distance, movement, heading, size, etc.) of the target (e.g., target 1230) to the network entity 1240 (e.g., radar server) and/or network entity 1250 (e.g., location server such as a location management function (LMF)) via communication signals 1270c, 1270d.

As previously mentioned, in bistatic, multi-static, and monostatic sensing, a sensing node (e.g., a network device, which may be in the form of a UE, such as network device 1210 of FIG. 12, or a base station, such as network device 1220) may need to report sensing measurements to the network (e.g., to a network entity, which may be in the form of a network server, such as network entity 1240 and network entity 1250). The description of FIG. 12, for example, describes an example of reporting of RF sensing measurements. This reporting of sensing measurements by the sensing node can be similar to the NR process of reporting of measurements for positioning by a UE.

Typically, however, RF sensing measurements are different than measurements for UE positioning. For example, UE positioning measurement reports, conversely to RF sensing measurements, generally only involve a LOS path or multiple hypothesis of LOS paths (e.g., including multiple TOA measurements and/or other multiple time-related measurements).

The amount of different types of sensing measurements for RF sensing may be larger than the number of types of positioning measurements for UE positioning, especially considering the many different diverse use cases for RF sensing. For example, UE positioning measurements may include angular estimation. However, RF sensing measurements may include angular estimation as well as speed estimation and range estimation.

Figure 13:
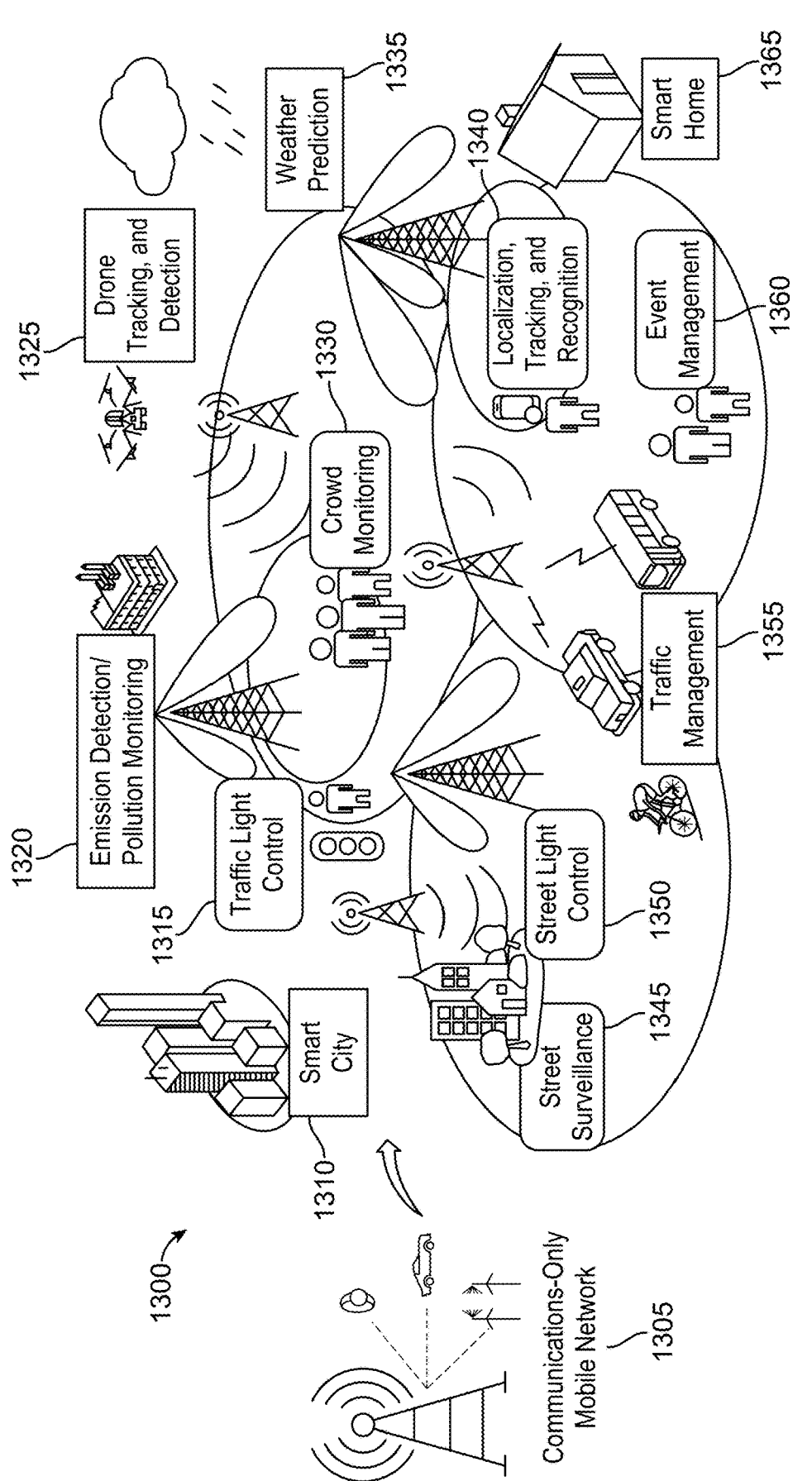
FIG. 13 is a diagram illustrating examples of use cases for wide area RF sensing, in accordance with some aspects of the present disclosure.

FIG. 13 shows examples of different diverse use cases for wide area RF sensing. In particular, FIG. 13 is a diagram 1300 illustrating examples of use cases for wide area RF sensing utilizing a communications-only mobile network 1305. In FIG. 13, the use cases for wide area RF sensing are shown to include, a smart city use case 1310; a traffic light control use case 1315; an emission detection/pollution monitoring use case 1320; a drone tracking and detection use case 1325; a crowd monitoring use case 1330; a weather prediction use case 1335; a localization, tracking, and recognition use case 1340; a street surveillance use case 1345; a street light control use case 1350; a traffic management use case 1355; an event management use case 1360; and a smart home use case 1365. There may more or less use cases for wide area RF sensing than as shown in FIG. 13; and there may be additional different use cases for wide area RF sensing than as shown in FIG. 13.

Currently, a perceptive cellular network is evolving to enable wide area RF sensing. Wide area RF sensing has several advantages over vision and/or LIDAR sensing including, but not limited to, providing broad coverage, allowing for a low cost (e.g., by reusing the cellular network and network device for RF sensing), being capable to operate in all weather conditions (e.g., during day and night), providing power efficiency, and allowing for privacy considerations. The merging of physical, digital, and virtual worlds can pave the road for the metaverse.

FIG. 14 is a table 1400 showing examples of different measurements for some of the different use cases for wide area RF sensing. In FIG. 14, the table 1400 is shown to include a column containing a listing of example use cases 1410. The example use cases 1410 in the table 1400 include traffic monitoring (e.g., traffic management 1355 of FIG. 13), identification of parking spaces or spots (e.g., street surveillance 1345 of FIG. 13), road safety (e.g., traffic management 1355 of FIG. 13), dynamic three-dimensional (3D) maps, drone monitoring and management (e.g., drone tracking and detection 1325 of FIG. 13), and environment monitoring (e.g., emission detection/pollution monitoring 1320 and/or weather prediction 1335 of FIG. 13).

The table 1400 also includes columns containing examples of measurement requirements for the different example use cases 1410. The columns of the table 1400 containing the example measurement requirements include example measurement requirements for a maximum range in meters (m) 1420, a maximum velocity in meters per seconds (m/s) 1430, a range resolution 1440, a velocity resolution 1450, and an angular resolution 1460. The table 1400 shows that the resolution requirements (e.g., range resolution 1440, velocity resolution 1450, and the angular resolution 1460) are very different for the different example use cases 1410.

In addition to, or instead of, wide area RF sensing, short range RF sensing may be utilized. RF sensing (including wide area and short range RF sensing) has several advantages over vision and/or LIDAR sensing including, but not limited to, allowing for a low cost (e.g., by reusing the cellular network and network device for RF sensing), being capable to operate in all weather conditions (e.g., during day and night), providing power efficiency, and allowing for privacy considerations.

FIG. 15 is a table 1500 showing examples of different measurements for different use cases for short range sensing. In FIG. 15, the table 1500 is shown to include a column that includes a listing of example use cases 1510. The example use cases 1510 in the table 1500 include human/animal detection, fall detection, breathing/heart rate estimation, location-aware control, driver attention monitoring, gesture recognition, keystroke recognition, head activity recognition, and arm recognition.

The table 1500 of FIG. 15 includes columns containing examples of measurement requirements for the different example use cases 1510. The columns of the table 1500 containing the example measurement requirements include example measurement requirements for a maximum range in meters 1520, a maximum velocity in meters per seconds 1530, a range resolution 1540, a Doppler resolution 1550, and an angular resolution 1560. The table 1500 shows that the resolution requirements (e.g., range resolution 1540, Doppler resolution 1550, and the angular resolution 1560) are quite different (e.g., ranging from low, to medium, to high resolution) for the different example use cases 1410.

In FIG. 15, table 1500 also shows that some of the example use cases 1510 for short range sensing do not have any requirements for some of the measurements. For example, the recognition use cases (e.g., gesture recognition, keystroke recognition, head activity recognition, and arm activity recognition) of the example use cases 1510 do not have any requirements for angular resolution. For another example, the driving attention monitoring use case of the example use cases 1510 does not have any requirements for maximum velocity and Doppler resolution.

As previously noted, for RF sensing (e.g., bistatic, multistatic, and monostatic sensing) a sensing node (e.g., a network device, which may be in the form of a UE, such as network device 1210 of FIG. 12, or a base station, such as network device 1220) may need to report sensing measurements to the network (e.g., to a network entity, which may be in the form of a network server, such as network entity 1240 and network entity 1250).

For RF sensing, machine learning and/or artificial intelligence (AI) technology has been employed to extract information from raw channel estimations (e.g., from raw measurements). Raw measurements can provide additional sensing information that is beyond the sensing information obtained from signal measurements, such as angle, range, and speed. For RF sensing, the raw measurements (e.g., including the raw channel estimations) can potentially be used to extract rich sensing information for the sensed environment. For example, the raw channel estimations can be based on an in-phase/quadrature (I/Q) sample (e.g., RF sensing sample) without any further processing being performed. In one or more examples, sensing nodes (e.g., network devices, such as UEs or gNBs) may transmit raw measurements to a network entity (e.g., network server) for low level processing. The network entity can gather these raw measurements from the sensing nodes, and perform machine learning on the gathered raw measurements to infer what activity (e.g., to recognize what type of gesture) is occurring. As such, enhancements on RF sensing measurement reports (e.g., including raw channel estimations) in cellular systems can be useful.

The systems and technique provide enhancements on RF sensing measurement reports in cellular systems. The systems and techniques provide measurement reports for RF sensing including, but not limited to, a per use-case based measurement report, a frequency domain measurement report, and a multi-step sensing measurement report. For example, a network device (e.g., network device 1210 of FIG. 12, such as a gNB or other network device) can transmit a measurement report including sensing measurements for one or more use cases for RF sensing to a network entity (e.g., network entity 1240 of FIG. 12, such as a server). In some cases, as described herein, the network device can determine the RF sensing measurements based on one or more received RF sensing resources.

In one or more aspects, a per-use case based measurement report may be utilized in cellular based RF sensing. For a per-use case based measurement report, the types of measurements needed for the particular use case may be known (e.g., known by the sensing nodes). In one or more examples, a standard (e.g., one or more Technical Specifications (TSs) of the 3GPP Standard) may define the measurements that are required for different types of use cases. The standards may also include the periodicity of obtaining the measurements as well as the channel to use for obtaining the measurements.

In one or more examples, for a per-use case based measurement report, the physical (PHY) layer measurement may be different across the different diverse RF sensing use cases. For example, for the use case of "dynamic 3D maps," the range, speed, and angle measurements may all needed. However, for the use case of "identification of parking spots" (or parking spaces), only the range and angle measurements may be needed.

In NR, a positioning measurement is per "positioning method" since there are no unified types of measurements defined for all positioning methods. For example, for the NR per positioning method, a location server will provide some coordination between a gNB and a UE. The UE will be guided to do generate a measurement report based on the position method (e.g., bistatic, multi-static, and monostatic sensing) being performed by the UE. Based on the position method performed by the UE, the UE can know what type of measurements that UE needs to report. For the NR per positioning method, the measurements needed are different for the different positioning methods. As such, in NR, there are no unified types of measurements defined for all of the different positioning methods.

In one or more examples, for the per-use case based measurement report for RF sensing, if (e.g., in the future) 3GPP only supports a limited number of use cases, per each use case, the RF sensing measurements to be reported can be defined. In some examples, for the per-use case based measurement report for RF sensing, if (in the future) 3GPP does not limit the use cases (e.g., there is no restriction on the use cases), there may be some mechanism to allow the network to dynamically request the specific types of measurements to be reported.

In one or more aspects, measurements may be combined across use cases. To reduce the signaling overhead, per the same group of sensing resources (e.g., sensing reference signals), the sensing node may indicate that the measurement report for a first use case (e.g., use case A) could be associated with the measurement report for a second use case (e.g., use case B), such that the sensing node does not need to repeat the common measurement report across the two use cases. Since the same sensing reference signals may be used for the first use case and the second use case, a common set of measurements can be reported (e.g., in uplink resources to a network entity) for both of these use cases. The combining of measurements across use cases can be driven by the observation that a sensing node may reuse measurements for multiple uses cases (e.g., use cases that have commonality). For example, for a "dynamic 3D map" use case and an "identification of parking spots" (or parking spaces) use case, these two use cases may have some commonality by sharing the same measurements in range and angle. As such, the sensing node can reuse the measurements from these two types of use cases, and does not need to repeat a transmission of a common measurement report for these two different use cases.

In one or more aspects, there may be an indication of priority of sensing measurement reports. The indication of priority of sensing measurement reports may be related to a restriction in the uplink resource. Since the uplink resource may be limited (e.g., within a certain time window) and since some measurements may be larger than other measurements, not all measurements may fit within the transmission resource (e.g., an uplink resource) and, as such, there can be several options to prioritize the sensing measurements (e.g., for transmission within the uplink resource) across different use cases. For example, if there are multiple use cases with limited uplink resources, there should be some priority for which use case is to be reported as the higher priority measurements. In one or more examples, the network (e.g., a network entity) may indicate the priority of the sensing measurement report across multiple use cases. For example, the use case for "smart transportation" (e.g., traffic management 1355 of FIG. 13) may be indicated by the network (e.g., by the network entity) to have a higher priority than other use cases.

Figure 16:
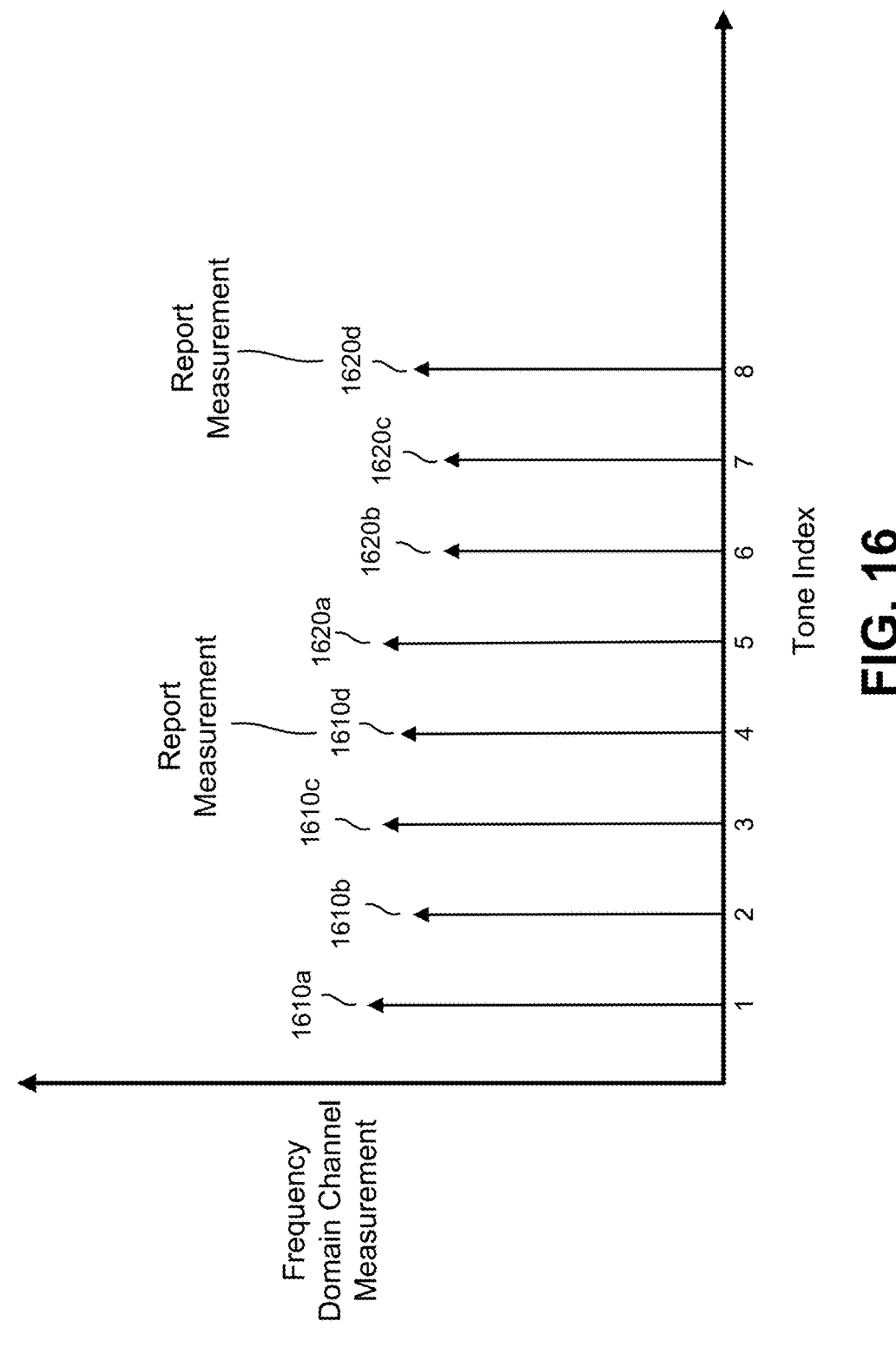
FIG. 16 is a graph illustrating an example of reporting down-sampled frequency domain channel measurements, in accordance with some aspects of the present disclosure.

In one or more aspects, a frequency domain (FD) channel measurement report for RF sensing may be utilized in cellular based RF sensing. A FD channel measurement report is related to raw measurements (e.g., raw channel estimations). Raw measurements can be obtained by performing a Fast Fourier Transform (FFT) on a I/Q sample capture. The result of the FFT can provide the raw channel in the frequency domain (e.g., referred to as the frequency domain channel). The frequency domain channel can provide a series of tones, where each tone has a tone index along with an amplitude and a phase. The graph 1600 of FIG. 16 shows an example of eight tones. These tones are the raw channel measurements, which can provide rich information regarding the sensed environment. An advanced algorithm (e.g., machine learning algorithm) can be used to fully exploit the raw measurements to infer an action (e.g., gesture). With the advance in machine learning (e.g., especially deep learning), the raw channel measurements can be expected to be able to enhance the sensing performance.

In one or more examples, the early fusion of RF measurements (e.g., sensing measurements obtained by radar)

and non-RF sensing measurements (e.g., sensing measurements obtained from other devices other than radar, such as LIDAR or cameras) can require the sensing node to report the raw measurements. Early fusion has been studied to be employed for many auto use cases. Early fusion can involve the fusion of raw RF sensing measurements with raw non-RF sensing measurements.

As previously mentioned, a FD channel measurement report for RF sensing may be utilized in cellular based RF sensing. The FD channel measurement is a complex number because it has an amplitude and a phase. In one or more examples, to reduce the network overhead, the real and/or imaginary part of FD channel measurements may be quantized and, then, reported to the network. The quantization level used for the quantization as well as the scaling factor used after quantization may be indicated (e.g., by the sensing node) to the network (e.g., network entity). The network (e.g., network entity) can utilize the quantization level and the scaling factor to recover the FD channel measurements from the quantized FD channel measurements.

In one or more examples, to reduce the signaling overhead, a subset (instead of the full set) of tones may be reported (e.g., by a sensing node) to the network (e.g., network entity). There may be a trade-off between performance and signaling overhead to determine whether or not to report only a subset of tones. In some cases, some of the tones may only include noise instead of target-related information. The sensing node may make a decision regarding which tone is likely noise and which tone includes the sensing signal reflected off of the target.

In one or more examples, to reduce the signaling overhead, there may be a threshold based tone selection. For example, the threshold may be based on a noise floor estimation. In one or more examples, a sensing node (e.g., a network device, such as a UE or gNB) can perform signal processing to estimate the noise. Based on the determined noise power, the sensing node may decide which tone is a noise tone or which tone includes a signal reflection and some noise. As such, there may be a threshold based selection to select which set of tones are to be reported to the network (e.g., network entity) by the sensing node.

In one or more examples, to reduce the signaling overhead, the down-sampled FD channel measurements may be reported. For example, a sensing node may report every 8 samples. For example, if the FD channel measurements are down-sampled with a rate of four, then for every four samples, one of the four samples may be reported by the sensing node (e.g., network device, such as a UE or gNB) to the network (e.g., network entity, such as a network server).

FIG. 16 is a graph 1600 illustrating an example of reporting down-sampled frequency domain channel measurements. In the graph 1600, the x-axis denotes the tone index, and the y-axis denotes the FD channel measurement. In the graph 1600, eight tones 1610a (tone index 1), 1610b (tone index 2), 1610c (tone index 3), 1610d (tone index 4), 1620a (tone index 5), 1620b (tone index 6), 1620c (tone index 7), 1620d (tone index 8) are shown, with each of the tones having a respective tone index. For this example, the FD channel measurements are down-sampled with a rate of four. As such, one of each of the sets of four samples can be reported by the sensing node to the network. For example, for the first set of four tones 1610a, 1610b, 1610c, 1610d, the fourth tone 1610d may be reported. For the second set of four tones 1620a, 1620b, 1620c, 1620d, the fourth tone 1620d may be reported.

In one or more examples, for the reporting of the tones, the frequency response index may need to be included in the report. For example, frequency response index for the fourth tone 1610d of the first set of tones, and the frequency response index for the fourth tone 1620d of the second set of tones may be reported.

In one or more examples, for a sensing node (e.g., a network device, such as a UE or gNB) with a limited number of antennas, the sensing node may report (e.g., to the network) the FD channel measurement per antenna. In some examples, the sensing node may need to indicate (e.g., to the network) the associated antenna port identification (ID). For example, the sensing node may need to indicate whether the FD channel measurement is from antenna 1 or antenna 2 in order for the network to know the mapping between the channel and the antennas.

In one or more examples, a sensing node (e.g., a network device, such as a UE or gNB) may report (e.g., to the network) the combined FD channel measurements across a group of antennas. In some examples, the sensing node may need to indicate (e.g., to the network) the group of associated antenna port identification. For example, if a sensing node has a total of sixteen (16) antennas, the antennas may be combined into two groups such that a first group includes antennas 1 through 8 and a second group includes antennas 9 through 16. The sensing node may combine the FD channel measurements from the first group of antennas, and may report the combination of the FD channel measurements from the first group of antennas to the network for processing. The sensing node may also combine the FD channel measurements from the second group of antennas, and may report the combination of the FD channel measurements from the second group of antennas to the network for processing.

Figure 17:
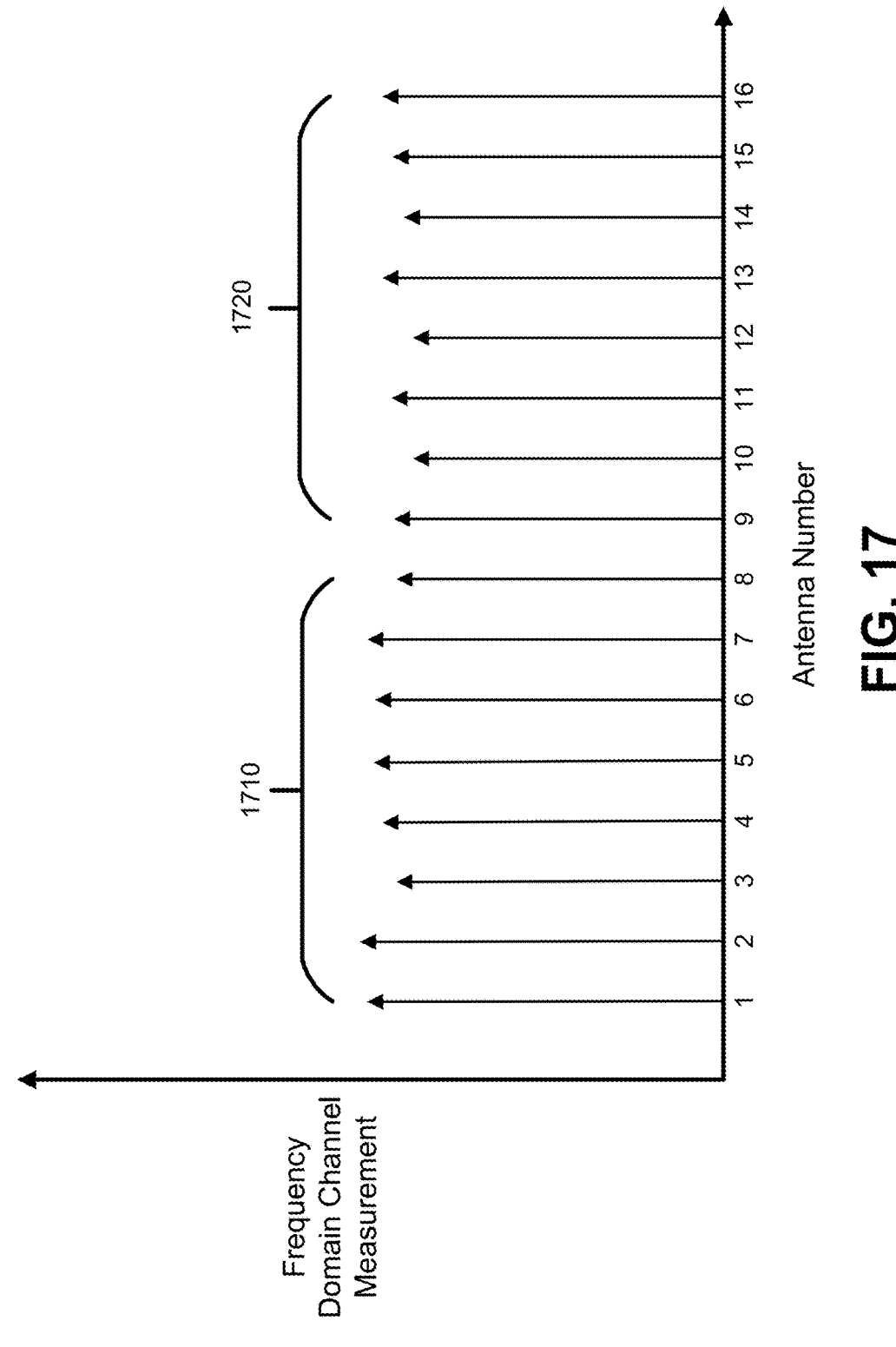
FIG. 17 is a graph illustrating an example of reporting frequency domain channel measurements for antennas, in accordance with some aspects of the present disclosure.

FIG. 17 is a graph 1700 illustrating an example of reporting frequency domain channel measurements for antennas. In the graph 1700, the x-axis denotes the antenna number, and the y-axis denotes the FD channel measurement. In the graph 1700, FD channel measurements obtained from sixteen (16) antennas of a sensing node are shown, where each FD channel measurement is from a respective antenna of the sensing node. For this example, the 16 antennas of the sensing node may be combined into two groups such that a first group includes antennas 1 through 8 and a second group includes antennas 9 through 16. A sensing node may combine the FD channel measurements 1710 from the first group of antennas (e.g., antennas 1 through 8), and may combine the FD channel measurements 1720 from the second group of antennas (e.g., antennas 9 through 12). The sensing node may report the combination of the FD channel measurements 1710 from the first group of antennas to the network, and may report the combination of the FD channel measurements 1720 from the second group of antennas to the network.

In one or more aspects, a sensing node (e.g., network device, such as a UE or gNB) may report (e.g., to a network) a multi-step sensing measurement report. In one or more examples, for a sensing measurement report on an uplink (UL) or sidelink (SL) data channel, such as a physical uplink shared channel (PUSCH) or a physical sidelink shared channel (PSSCH), the sensing measurement payload size can vary quite dramatically depending on the different use cases, UE implementation, and/or sensing measurement report configurations. For example, the channel state information (CSI) may be too large of a size to fit within an uplink resource and, as such, some CSI information of the report may need to be omitted from the report for transmission. For instance, a sensing measurement report may be split into two or more parts, such that a subset of the parts is a constant size and the remaining parts are a variable size. The size of the remaining parts may be changing because, for example, the UE may be reporting sensing measurements across different use cases. Since the different use cases can have different amounts (and/or sizes) of required measurements that need to be reported to the network by the sensing node, the sensing node may not have a fixed allocated uplink resource.

In one or more examples, since a gNB may not know this information (e.g., such as the sensing use cases and/or the number of selected gNBs for the measurement at the UE side) prior to scheduling an aperiodic sensing measurement report (e.g., on the PUSCH), the gNB may allocate uplink resources (e.g., PUSCH resources), such in a frequency and time domain, by using a prediction of the needed payload size. In one or more examples, the prediction may be based on payload sizes from historic sensing measurement reports.

In one or more examples, the gNB may allocate uplink resources (e.g., PUSCH resources) with the assumption that the sensing node (e.g., UE etc.) will report the same quantity of sensing measurements as the previous sensing measurement report. However, in some cases, the payload size for the previous report may not be large enough for the current report. In such cases, the sensing measurement report payload will not fit within the uplink resource container such as a PUSCH container (e.g., the code rate will be too large or the un-coded systematic bits will not fit). The CSI report (e.g., a MIMO CSI report) may introduce a scheme of partial CSI omissions, where a portion of the CSI (e.g., which can provide some utility to the gNB and at least give information about the rank indication (RI) selection such that the gNB can allocate a proper PUSCH resource for the next aperiodic CSI request) can still be reported. As such, at least some CSI information will be given, but other CSI information may be omitted. This operates as an omission mechanism in the CSI report. However, when reusing the idea of a partial CSI omission, a portion of the sensing measurement is omitted from the report, which can lead to a large performance loss.

In one or more aspects, if the uplink resource is not large enough (e.g., the size of the uplink resource container is not large enough), then a multi-step sensing measurement report may be employed. In one or more examples, the sensing node (e.g., network device such as a UE) can indicate the completeness or incompleteness of a RF sensing measurement report. For example, the UE can indicate whether the RF sensing measurement report is complete or incomplete by using one bit (e.g., a bit flag, such as a 0 or a 1) in the allocated PUSCH payload. For example, if the bit is set of zero (0), this can indicate that the sensing measurement report is incomplete. However, if the bit is set to one (1), this can indicate that the sensing measurement report is complete.

In one or more examples, the sensing node (e.g., network device, such as a UE) can indicate the RF sensing measurement report is complete or incomplete. For example, the UE can use more payload bits (e.g., two or more payload bits) to further indicate which sensing measurement report is omitted in the current report.

In one or more examples, the sensing node (e.g., network device, such as a UE) may be requested to report sensing measurements for multiple use cases. However, the sensing node may omit the sensing measurement for one or more use cases in the current report, as some use cases may have a higher priority, when the resource for measurement is limited. In some examples, the sensing node (e.g., network device such as a UE) may need to report the FD channel measurement across multiple antennas. However, the sensing node may omit the sensing measurement report for one or more antennas in the current report, due to the limitation in the uplink resource. In one or more examples, the sensing node (e.g., network device such as a UE) may only report a subset of measurement types in the current report due to a high priority request from the network.

In one or more aspects, a sensing node (e.g., network device, such as a UE or gNB) may postpone reporting (e.g., to a network) a sensing measurement report. In one or more examples, there may be many sensing measurements that need to be reported, however there may be cases where the sensing node (e.g., network device such as a UE) may need to postpone of the measurements in the current report. For example, if some sensing measurements are omitted in the current report, the sensing node should assume that these measurements are postponed, meaning that the sensing should not remove this information from the memory. The sensing node should keep this memory and get ready for the next uplink transmission (e.g., the sensing node should wait for a new grant from the base station to send the remaining report). As such, the sensing node should assume that this measurement is not deleted, should reserve this measurement, and should get ready for the next transmission opportunity. In one or more examples, the behavior of the sensing node, for when an uplink resource is limited, can be defined in the standards.

In one or more examples, enough bits should be reserved (e.g., by the sensing node) to indicate which sensing measurement is not reported in the current report. These information bits should have a higher priority, which should be reserved for the purpose of indication once the sensing measurement is incomplete. In some examples, the indication could indicate to the base station which sensing measurement is omitted and could help the base station to decide the payload size of the PUSCH for the postponed report. In some examples, the sensing node (e.g., network device, such as a UE) may indicate the minimum payload size of the PUSCH needed for the postponed report.

Figure 18:
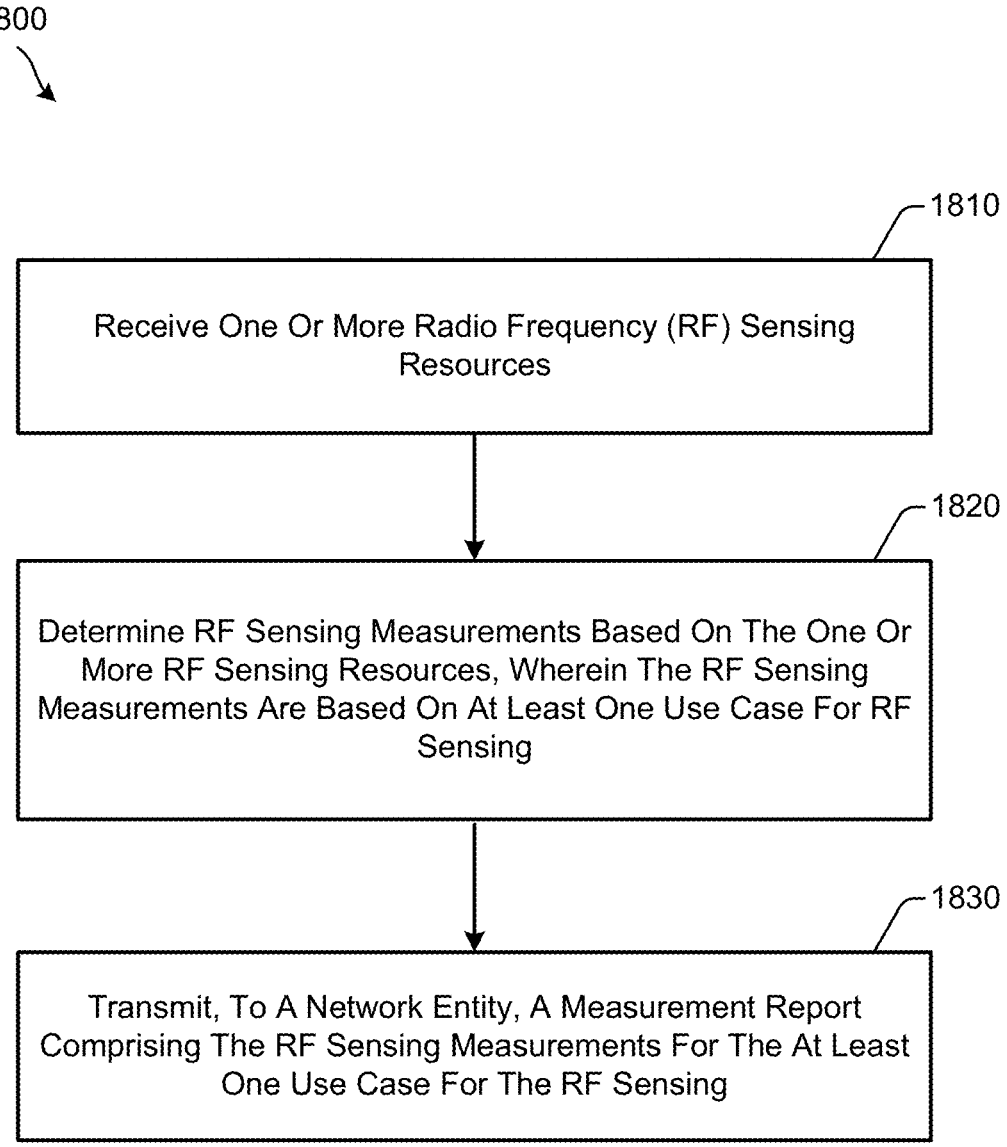
FIG. 18 is a flow chart illustrating an example of a process for wireless communications utilizing methods for enhancements on RF sensing measurement reports in cellular systems, in accordance with some aspects of the present disclosure.

FIG. 18 is a flow chart illustrating an example of a process 1800 for wireless communications utilizing methods for enhancements on RF sensing measurement reports in cellular systems. The process 1800 can be performed by a network device, such as a UE, a base station (e.g., gNB), a portion of a base station (e.g., one or more of a CU, DU, RU, and/or other portion of a base station having a disaggregated architecture), or a component or system (e.g., a chipset) of the UE or base station. The UE may be a mobile device (e.g., a mobile phone), a vehicle, a wearable device (e.g., a network-connected watch or other wearable device), an extended reality (XR) device (e.g., a virtual reality (VR) or augmented reality (AR) headset or glasses), or other type of UE. The operations of the process 1800 may be implemented as software components that are executed and run on one or more processors (e.g., processor 1910 of FIG. 19 or other processor(s)). Further, the transmission and reception of signals by the wireless communications device in the process 1800 may be enabled, for example, by one or more antennas and/or one or more transceivers (e.g., wireless transceiver(s)).

At block 1810, the network device (or component thereof) can receive one or more radio frequency (RF) sensing resources. In some cases, the one or more RF sensing resources include one or more RF sensing reference signals (e.g., sensing signals, such as RF sensing signals 1260a, 1260b of FIG. 12).

At block 1820, the network device (or component thereof) can determine RF sensing measurements based on the one or more RF sensing resources. In some cases, the network device (or component thereof) can receive, from the network entity, at least one request for the RF sensing measurements. The RF sensing measurements are based on at least one use case for RF sensing (e.g., for bistatic sensing, multi-static sensing, and/or monostatic sensing). In some examples, the at least one use case can include traffic monitoring, identification of parking spaces, road safety, dynamic three-dimensional (3D) maps, drone monitoring, drone management, environment monitoring, human detection, animal detection, fall detection, breathing estimation, heart rate estimation, location-aware control, driver attention monitoring, gesture recognition, keystroke recognition, head activity recognition, arm recognition, any combination thereof, and/or other use cases.

In some cases, the RF sensing measurements include angular estimation, speed estimation, Doppler estimation, range estimation, any combination thereof, and/or other types of RF sensing measurements. In one illustrative example, the speed estimation is a radial speed estimation.

At block 1830, the network device (or component thereof) can transmit, to a network entity (e.g., network entity 1240 of FIG. 12), a measurement report comprising the RF sensing measurements for the at least one use case for RF sensing. The network entity can be a server (e.g., a radar server), a base station (e.g., a gNB) or portion of the base station (e.g., CU, DU, RU, etc. of a gNB having a disaggregated architecture). In some aspects, the at least one use case includes a plurality of use cases (e.g., two or more of traffic monitoring, identification of parking spaces, etc.). In such aspects, the measurement report can include respective RF sensing measurements for each use case of the plurality of use cases (e.g., first RF sensing measurements for a first use case, second RF sensing measurements for a second use case, and so on). In some cases, the at least one use case includes at least a first use case and a second use case that has commonality with the first use case. In such cases, the measurement report includes an indication that the measurement report is associated with the first use case and the second use case.

In some examples, the network device (or component thereof) can receive, from the network entity, an indication of a priority for the measurement report across a plurality of use cases (which include the at least one use case). In some cases, the measurement report includes an indication of whether the measurement report is complete or incomplete. In some examples, the indication of whether the measurement report is complete or incomplete includes a bit in an uplink payload of the measurement report. In one illustrative example, when the measurement report is incomplete, the indication of whether the measurement report is complete or incomplete indicates which measurements are omitted from the measurement report using a plurality of bits in an uplink payload of the measurement report.

In some aspects, the measurement report includes frequency domain (FD) channel measurements. For instance, in some cases, the FD channel measurements are quantized FD channel measurements. In such cases, the measurement report includes an indication of a quantization level and/or a scaling factor for the quantized FD channel measurements. In some examples, the FD channel measurements are associated with one or more antennas of a plurality of antennas of the network device. In such examples, the measurement report includes an indication of each of the one or more antennas associated with the FD channel measurements. In some cases, the FD channel measurements include one or more combined FD channel measurements. In some examples, each of the one or more combined FD channel measurements is associated with a respective group of antennas from the plurality of antennas of the network device.

Figure 19:
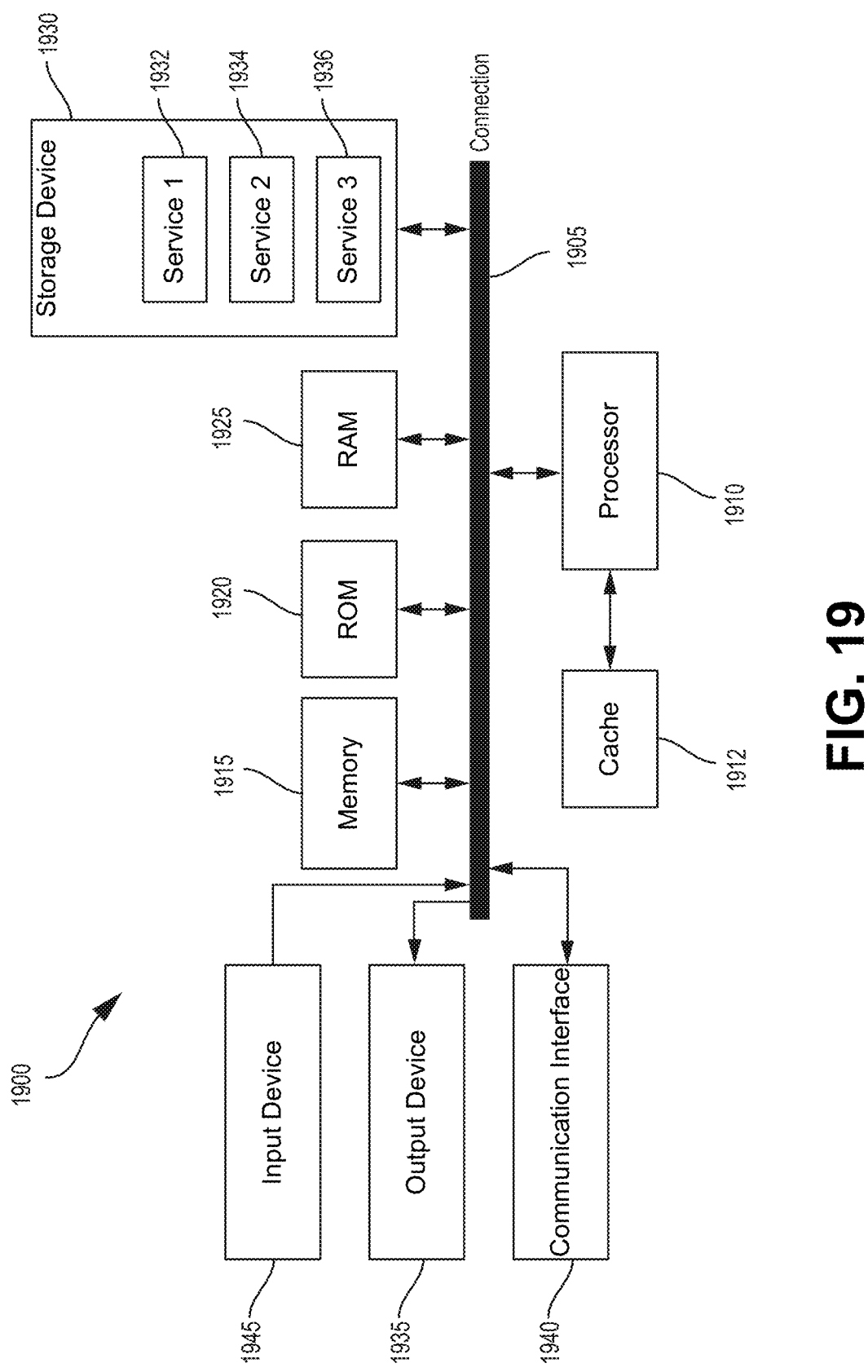
FIG. 19 is a block diagram illustrating an example of a computing system, which may be employed by the disclosed systems and for enhancements on RF sensing measurement reports in cellular systems, in accordance with some aspects of the present disclosure.

FIG. 19 is a block diagram illustrating an example of a computing system 1900, which may be employed by the disclosed systems and techniques for enhancements on RF sensing measurement reports in cellular systems. In particular, FIG. 19 illustrates an example of computing system 1900, which can be, for example, any computing device making up internal computing system, a remote computing system, a camera, or any component thereof in which the components of the system are in communication with each other using connection 1905. Connection 1905 can be a physical connection using a bus, or a direct connection into processor 1910, such as in a chipset architecture. Connection 1905 can also be a virtual connection, networked connection, or logical connection.

In some aspects, computing system 1900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1900 includes at least one processing unit (CPU or processor) 1910 and connection 1905 that communicatively couples various system components including system memory 1915, such as read-only memory (ROM) 1920 and random access memory (RAM) 1925 to processor 1910. Computing system 1900 can include a cache 1912 of high-speed memory connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms. In some instances, multimodal systems can enable a user to provide multiple types of input/output to communicate with computing system 1900.

Computing system 1900 can include communications interface 1940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1940 may also include one or more range sensors (e.g., LIDAR sensors, laser range finders, RF radars, ultrasonic sensors, and infrared (IR) sensors) configured to collect data and provide measurements to processor 1910, whereby processor 1910 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1940 may also include one or more Global Navigation Satellite System (GNSS) receivers or transceivers that are used to determine a location of the computing system 1900 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1930 can include software services, servers, services, etc., that when the code that defines such software is executed by the processor 1910, it causes the system to perform a function. In some aspects, a hardware service that performs a particular function can include the software component stored in a computer-readable medium in connection with the necessary hardware components, such as processor 1910, connection 1905, output device 1935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A network device for wireless communications, the network device comprising: at least one memory; and at least one processor coupled to the at least one memory and configured to: receive one or more radio frequency (RF) sensing resources; determine RF sensing measurements based on the one or more RF sensing resources, wherein the RF sensing measurements are based on at least one use case for RF sensing; and transmit, to a network entity, a measurement report comprising the RF sensing measurements for the at least one use case for the RF sensing.

Aspect 2. The network device of Aspect 1, wherein the network device is one of user equipment (UE) or a base station.

Aspect 3. The network device of any one of Aspects 1 or 2, wherein the network entity is a network server.

Aspect 4. The network device of any one of Aspects 1 to 3, wherein the at least one use case is at least one of traffic monitoring, identification of parking spaces, road safety, dynamic three-dimensional (3D) maps, drone monitoring, drone management, environment monitoring, human detection, animal detection, fall detection, breathing estimation, heart rate estimation, location-aware control, driver attention monitoring, gesture recognition, keystroke recognition, head activity recognition, or arm recognition.

Aspect 5. The network device of any one of Aspects 1 to 4, wherein the RF sensing is one of bistatic sensing, multistatic sensing, or monostatic sensing.

Aspect 6. The network device of any one of Aspects 1 to 5, wherein the RF sensing measurements comprise at least one of angular estimation, speed estimation, Doppler estimation, or range estimation.

Aspect 7. The network device of Aspect 6, wherein the speed estimation is a radial speed estimation.

Aspect 8. The network device of any one of Aspects 1 to 7, wherein the at least one use case comprises a plurality of use cases, and wherein the measurement report comprises respective RF sensing measurements for each use case of the plurality of use cases.

Aspect 9. The network device of any one of Aspects 1 to 8, wherein the at least one processor is configured to receive, from the network entity, at least one request for the RF sensing measurements.

Aspect 10. The network device of any one of Aspects 1 to 9, wherein the at least one use case comprises at least a first use case and a second use case that has commonality with the first use case, and wherein the measurement report includes an indication that the measurement report is associated with the first use case and the second use case.

Aspect 11. The network device of any one of Aspects 1 to 10, wherein the at least one processor is configured to receive, from the network entity, an indication of a priority for the measurement report across a plurality of use cases comprising the at least one use case.

Aspect 12. The network device of any one of Aspects 1 to 11, wherein the measurement report comprises frequency domain (FD) channel measurements.

Aspect 13. The network device of Aspect 12, wherein the FD channel measurements are quantized FD channel measurements.

Aspect 14. The network device of Aspect 13, wherein the measurement report includes an indication of at least one of a quantization level or a scaling factor for the quantized FD channel measurements.

Aspect 15. The network device of any one of Aspects 12 to 14, wherein the FD channel measurements are associated with one or more antennas of a plurality of antennas of the network device.

Aspect 16. The network device of Aspect 15, wherein the measurement report includes an indication of each of the one or more antennas associated with the FD channel measurements.

Aspect 17. The network device of any one of Aspects 12 to 16, wherein the FD channel measurements comprise one or more combined FD channel measurements, wherein each of the one or more combined FD channel measurements is associated with a respective group of antennas from a plurality of antennas of the network device.

Aspect 18. The network device of any one of Aspects 1 to 17, wherein the measurement report includes an indication of whether the measurement report is complete or incomplete.

Aspect 19. The network device of Aspect 18, wherein the indication of whether the measurement report is complete or incomplete includes a bit in an uplink payload of the measurement report.

Aspect 20. The network device of any one of Aspects 18 or 19, wherein, when the measurement report is incomplete, the indication of whether the measurement report is complete or incomplete indicates which measurements are omitted from the measurement report using a plurality of bits in an uplink payload of the measurement report.

Aspect 21. The network device of any one of Aspects 1 to 20, wherein the one or more RF sensing resources include one or more RF sensing reference signals.

Aspect 22. A method for wireless communications at a network device, the method comprising: receiving, by the network device, one or more radio frequency (RF) sensing resources; determining, by the network device, RF sensing measurements based on the one or more RF sensing resources, wherein the RF sensing measurements are based on at least one use case for RF sensing; and transmitting, by the network device to a network entity, a measurement report comprising the RF sensing measurements for the at least one use case for the RF sensing.

Aspect 23. The method of Aspect 22, wherein the network device is one of user equipment (UE) or a base station.

Aspect 24. The method of any one of Aspects 22 or 23, wherein the network entity is a network server.

Aspect 25. The method of any one of Aspects 22 to 24, wherein the at least one use case is at least one of traffic monitoring, identification of parking spaces, road safety, dynamic three-dimensional (3D) maps, drone monitoring, drone management, environment monitoring, human detection, animal detection, fall detection, breathing estimation, heart rate estimation, location-aware control, driver attention monitoring, gesture recognition, keystroke recognition, head activity recognition, or arm recognition.

Aspect 26. The method of any one of Aspects 22 to 25, wherein the RF sensing is one of bistatic sensing, multistatic sensing, or monostatic sensing.

Aspect 27. The method of any one of Aspects 22 to 26, wherein the RF sensing measurements comprise at least one of angular estimation, speed estimation, Doppler estimation, or range estimation.

Aspect 28. The method of Aspect 27, wherein the speed estimation is a radial speed estimation.

Aspect 29. The method of any one of Aspects 22 to 28, wherein the at least one use case comprises a plurality of use cases, and wherein the measurement report comprises respective RF sensing measurements for each use case of the plurality of use cases.

Aspect 30. The method of any one of Aspects 22 to 29, further comprising receiving, from the network entity, at least one request for the RF sensing measurements.

Aspect 31. The method of any one of Aspects 22 to 30, wherein the at least one use case comprises at least a first use case and a second use case that has commonality with the first use case, and wherein the measurement report includes an indication that the measurement report is associated with the first use case and the second use case.

Aspect 32. The method of any one of Aspects 22 to 31, further comprising receiving, by the network device from the network entity, an indication of a priority for the measurement report across a plurality of use cases comprising the at least one use case.

Aspect 33. The method of any one of Aspects 22 to 32, wherein the measurement report comprises frequency domain (FD) channel measurements.

Aspect 34. The method of Aspect 33, wherein the FD channel measurements are quantized FD channel measurements.

Aspect 35. The method of Aspect 34, wherein the measurement report includes an indication of at least one of a quantization level or a scaling factor for the quantized FD channel measurements.

Aspect 36. The method of any one of Aspects 33 to 35, wherein the FD channel measurements are associated with one or more antennas of a plurality of antennas of the network device.

Aspect 37. The method of Aspect 36, wherein the measurement report includes an indication of each of the one or more antennas associated with the FD channel measurements.

Aspect 38. The method of any one of Aspects 33 to 37, wherein the FD channel measurements comprise one or more combined FD channel measurements, wherein each of the one or more combined FD channel measurements is associated with a respective group of antennas from a plurality of antennas of the network device.

Aspect 39. The method of any one of Aspects 22 to 38, wherein the measurement report includes an indication of whether the measurement report is complete or incomplete.

Aspect 40. The method of Aspect 39, wherein the indication of whether the measurement report is complete or incomplete includes a bit in an uplink payload of the measurement report.

Aspect 41. The method of any one of Aspects 39 or 40, wherein, when the measurement report is incomplete, the indication of whether the measurement report is complete or incomplete indicates which measurements are omitted from the measurement report using a plurality of bits in an uplink payload of the measurement report.

Aspect 42. The method of any one of Aspects 22 to 41, wherein the one or more RF sensing resources include one or more RF sensing reference signals.

Aspect 43. A non-transitory computer-readable medium having stored thereon instructions that, when executed by at least one processor, cause the at least one processor to perform operation according to any of Aspects 22 to 42.

Aspect 44. An apparatus for wireless communications, comprising one or more means for performing operations according to any of Aspects 22 to 42.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A network device for wireless communications, the network device comprising:

at least one memory; and at least one processor coupled to the at least one memory and configured to:

receive one or more radio frequency (RF) sensing resources;

determine RF sensing measurements based on the one or more RF sensing resources, wherein the RF sensing measurements are based on at least one use case for RF sensing; and transmit, to a network entity, a measurement report comprising the RF sensing measurements for the at least one use case for the RF sensing.

2. The network device of claim 1, wherein the network device is one of user equipment (UE) or a base station.

3. The network device of claim 1, wherein the network entity is a network server.

4. The network device of claim 1, wherein the at least one use case is at least one of traffic monitoring, identification of parking spaces, road safety, dynamic three-dimensional (3D) maps, drone monitoring, drone management, environment monitoring, human detection, animal detection, fall detection, breathing estimation, heart rate estimation, location-aware control, driver attention monitoring, gesture recognition, keystroke recognition, head activity recognition, or arm recognition.

5. The network device of claim 1, wherein the RF sensing is one of bistatic sensing, multi-static sensing, or monostatic sensing.

6. The network device of claim 1, wherein the RF sensing measurements comprise at least one of angular estimation, speed estimation, Doppler estimation, or range estimation.

7. The network device of claim 6, wherein the speed estimation is a radial speed estimation.

8. The network device of claim 1, wherein the at least one use case comprises a plurality of use cases, and wherein the measurement report comprises respective RF sensing measurements for each use case of the plurality of use cases.

9. The network device of claim 1, wherein the at least one processor is configured to receive, from the network entity, at least one request for the RF sensing measurements.

10. The network device of claim 1, wherein the at least one use case comprises at least a first use case and a second use case that has commonality with the first use case, and wherein the measurement report includes an indication that the measurement report is associated with the first use case and the second use case.

11. The network device of claim 1, wherein the at least one processor is configured to receive, from the network entity, an indication of a priority for the measurement report across a plurality of use cases comprising the at least one use case.

12. The network device of claim 1, wherein the measurement report comprises frequency domain (FD) channel measurements.

13. The network device of claim 12, wherein the FD channel measurements are quantized FD channel measurements.

14. The network device of claim 13, wherein the measurement report includes an indication of at least one of a quantization level or a scaling factor for the quantized FD channel measurements.

15. The network device of claim 12, wherein the FD channel measurements are associated with one or more antennas of a plurality of antennas of the network device.

16. The network device of claim 15, wherein the measurement report includes an indication of each of the one or more antennas associated with the FD channel measurements.

17. The network device of claim 12, wherein the FD channel measurements comprise one or more combined FD channel measurements, wherein each of the one or more combined FD channel measurements is associated with a respective group of antennas from a plurality of antennas of the network device.

18. The network device of claim 1, wherein the measurement report includes an indication of whether the measurement report is complete or incomplete.

19. The network device of claim 18, wherein the indication of whether the measurement report is complete or incomplete includes a bit in an uplink payload of the measurement report.

20. The network device of claim 18, wherein, when the measurement report is incomplete, the indication of whether the measurement report is complete or incomplete indicates which measurements are omitted from the measurement report using a plurality of bits in an uplink payload of the measurement report.

21. The network device of claim 1, wherein the one or more RF sensing resources include one or more RF sensing reference signals.

22. A method for wireless communications at a network device, the method comprising:

receiving, by the network device, one or more radio frequency (RF) sensing resources;

determining, by the network device, RF sensing measurements based on the one or more RF sensing resources, wherein the RF sensing measurements are based on at least one use case for RF sensing; and transmitting, by the network device to a network entity, a measurement report comprising the RF sensing measurements for the at least one use case for the RF sensing.

23. The method of claim 22, wherein the network device is one of user equipment (UE) or a base station, and wherein the network entity is a network server.

24. The method of claim 22, wherein the at least one use case is at least one of traffic monitoring, identification of parking spaces, road safety, dynamic three-dimensional (3D) maps, drone monitoring, drone management, environment monitoring, human detection, animal detection, fall detection, breathing estimation, heart rate estimation, location-aware control, driver attention monitoring, gesture recognition, keystroke recognition, head activity recognition, or arm recognition.

25. The method of claim 22, wherein the RF sensing measurements comprise at least one of angular estimation, speed estimation, Doppler estimation, or range estimation.

26. The method of claim 22, wherein the at least one use case comprises a plurality of use cases, and wherein the measurement report comprises respective RF sensing measurements for each use case of the plurality of use cases.

27. The method of claim 22, wherein the at least one use case comprises at least a first use case and a second use case that has commonality with the first use case, and wherein the measurement report includes an indication that the measurement report is associated with the first use case and the second use case.

28. The method of claim 22, further comprising receiving, by the network device from the network entity, an indication of a priority for the measurement report across a plurality of use cases comprising the at least one use case.

29. The method of claim 22, wherein the measurement report comprises frequency domain (FD) channel measurements, wherein the FD channel measurements are at least one of quantized FD channel measurements, associated with one or more antennas of a plurality of antennas of the network device, or comprise one or more combined FD channel measurements, wherein each of the one or more combined FD channel measurements is associated with a respective group of antennas from a plurality of antennas of the network device.

30. The method of claim 22, wherein the measurement report includes an indication of whether the measurement report is complete or incomplete, and wherein, when the measurement report is incomplete, the indication of whether the measurement report is complete or incomplete indicates which measurements are omitted from the measurement report using a plurality of bits in an uplink payload of the measurement report.

* * * * *